US008221846B2

(12) United States Patent
Roche et al.

(10) Patent No.: US 8,221,846 B2
(45) Date of Patent: Jul. 17, 2012

(54) MERCHANDISERS HAVING ANTI-FOG COATINGS AND METHODS FOR MAKING THE SAME

(75) Inventors: John M. Roche, Ballwin, MO (US); Sesha C. Madireddi, St. Charles, MO (US); Edward A. Bernheim, Corpus Christi, TX (US); Benjamin W. Raglin, Mathis, TX (US)

(73) Assignee: Hussmann Corporation, Bridgeton, MO (US)

( * ) Notice: Subject to any disclaimer, the term of this patent is extended or adjusted under 35 U.S.C. 154(b) by 0 days.

(21) Appl. No.: 12/615,569

(22) Filed: Nov. 10, 2009

(65) Prior Publication Data
US 2010/0119705 A1 May 13, 2010

Related U.S. Application Data

(60) Division of application No. 10/982,396, filed on Nov. 5, 2004, now abandoned, which is a continuation-in-part of application No. 10/341,525, filed on Jan. 13, 2003, now abandoned.

(60) Provisional application No. 60/377,334, filed on May 2, 2002.

(51) Int. Cl.
B05D 3/02 (2006.01)
(52) U.S. Cl. .................................................. 427/385.5
(58) Field of Classification Search ........................ None
See application file for complete search history.

(56) References Cited

U.S. PATENT DOCUMENTS

| 1,893,525 A | 1/1933 | Sherer |
| 3,515,579 A | 6/1970 | Shepherd et al. |
| 3,635,756 A | 1/1972 | Shepherd et al. |
| 3,779,792 A | 12/1973 | Stoy et al. |
| 3,896,589 A | 7/1975 | Mitchell |
| 3,900,672 A | 8/1975 | Hammond et al. |
| 4,018,939 A | 4/1977 | Merrill et al. |
| 4,127,765 A | 11/1978 | Heaney |
| 4,223,482 A | 9/1980 | Barroero et al. |
| 4,243,719 A | 1/1981 | Holmes |
| 4,467,073 A | 8/1984 | Creasy |
| 4,490,423 A | 12/1984 | Gould et al. |
| 4,551,484 A | 11/1985 | Radisch et al. |
| 4,609,688 A | 9/1986 | Radisch et al. |
| 4,617,327 A | 10/1986 | Podszun |
| 4,684,694 A | 8/1987 | Breuer et al. |
| 4,767,671 A | 8/1988 | Parker et al. |
| 4,789,720 A | 12/1988 | Teffenhart |
| 4,797,494 A | 1/1989 | Ivanov et al. |

(Continued)

FOREIGN PATENT DOCUMENTS
EP 0 036 657 9/1981
(Continued)

OTHER PUBLICATIONS

Great Britain Patent Office Action for Application No. GB0522434.0 dated Jan. 26, 2010 (4 pages).

(Continued)

*Primary Examiner* — Erma Cameron
(74) *Attorney, Agent, or Firm* — Michael Best & Friedrich LLP

(57) ABSTRACT

A variety of refrigerators and merchandisers having glass or plastic substrates that are substantially fog-resistant are provided. For example, refrigerator doors having a substantially transparent substrate including an anti-fog coating on at least a portion thereof are provided. Many of the coatings exhibit color stable properties.

11 Claims, 17 Drawing Sheets

U.S. PATENT DOCUMENTS

| | | | |
|---|---|---|---|
| 4,826,914 A | 5/1989 | Raedisch et al. |
| 4,844,983 A | 7/1989 | Parker et al. |
| 4,976,837 A | 12/1990 | Hughes et al. |
| 4,983,461 A | 1/1991 | Daude et al. |
| 5,097,642 A | 3/1992 | Richardson et al. |
| 5,116,442 A | 5/1992 | Daude et al. |
| 5,120,816 A | 6/1992 | Gould et al. |
| 5,126,209 A | 6/1992 | Kruger |
| 5,210,169 A | 5/1993 | Muhlebach et al. |
| 5,228,240 A | 7/1993 | Barroero et al. |
| 5,262,475 A | 11/1993 | Creasy |
| 5,273,812 A | 12/1993 | Oguchi et al. |
| 5,329,736 A | 7/1994 | Sodervall |
| 5,352,755 A | 10/1994 | Hughes et al. |
| 5,363,611 A | 11/1994 | Richardson et al. |
| 5,393,333 A | 2/1995 | Trouve |
| 5,449,885 A | 9/1995 | Vandecastele |
| 5,480,917 A | 1/1996 | Kruger et al. |
| 5,544,454 A | 8/1996 | Richardson et al. |
| 5,578,378 A | 11/1996 | Kruger et al. |
| 5,612,240 A | 3/1997 | Chang |
| 5,725,294 A | 3/1998 | Froelicher |
| 5,766,739 A | 6/1998 | Funaki et al. |
| 5,877,254 A | 3/1999 | La Casse et al. |
| 5,891,556 A | 4/1999 | Anderson et al. |
| 5,986,033 A | 11/1999 | Hughes et al. |
| 6,024,084 A | 2/2000 | Gerhardinger |
| 6,052,965 A | 4/2000 | Florentin et al. |
| 6,111,048 A | 8/2000 | Asahina et al. |
| 6,117,919 A | 9/2000 | Oda et al. |
| 6,148,563 A | 11/2000 | Roche et al. |
| 6,238,781 B1 | 5/2001 | Anderson et al. |
| 6,268,594 B1 | 7/2001 | Leutner |
| 6,306,796 B1 | 10/2001 | Suzue et al. |
| 6,337,124 B1 | 1/2002 | Anderson et al. |
| 6,401,399 B1 | 6/2002 | Roche et al. |
| 6,435,630 B1 | 8/2002 | Anin et al. |
| 6,475,626 B1 | 11/2002 | Stachowiak |
| 6,495,203 B2 | 12/2002 | Anderson et al. |
| 6,804,048 B2 | 10/2004 | MacQuart et al. |
| 6,874,329 B2 | 4/2005 | Stark et al. |
| 6,874,333 B2 | 4/2005 | Fjaestad et al. |
| 6,874,567 B2 | 4/2005 | Ohara |
| 6,875,001 B2 | 4/2005 | Song et al. |
| 7,003,920 B1 | 2/2006 | Messere et al. |
| 2001/0002295 A1 | 5/2001 | Anderson et al. |
| 2001/0031365 A1 | 10/2001 | Anderson et al. |
| 2002/0001724 A1 | 1/2002 | Anderson et al. |
| 2002/0034627 A1 | 3/2002 | Jacquiod et al. |
| 2002/0037402 A1 | 3/2002 | Yamazaki et al. |
| 2003/0082367 A1 | 5/2003 | Talpaert et al. |
| 2003/0205059 A1 | 11/2003 | Roche et al. |
| 2004/0137155 A1 | 7/2004 | Bernheim et al. |
| 2004/0194388 A1 | 10/2004 | Roche et al. |
| 2004/0241406 A1 | 12/2004 | Nadaud et al. |
| 2004/0241457 A1 | 12/2004 | Macquardt et al. |
| 2005/0064101 A1 | 3/2005 | Messere et al. |
| 2005/0064173 A1 | 3/2005 | Messere et al. |
| 2005/0072173 A1 | 4/2005 | Yamasaki et al. |
| 2005/0072334 A1 | 4/2005 | Czubarow et al. |
| 2005/0072561 A1 | 4/2005 | Ozaki |
| 2005/0074354 A1 | 4/2005 | Ebara et al. |
| 2005/0100730 A1 | 5/2005 | Messere et al. |
| 2005/0202178 A1 | 9/2005 | Roche et al. |
| 2006/0005484 A1 | 1/2006 | Riblier et al. |
| 2006/0127586 A1 | 6/2006 | Roche et al. |
| 2006/0159906 A1 | 7/2006 | Messere et al. |
| 2007/0003700 A1 | 1/2007 | Roche et al. |
| 2010/0062152 A1 | 3/2010 | Roche et al. |
| 2010/0068398 A1 | 3/2010 | Roche et al. |

FOREIGN PATENT DOCUMENTS

| | | |
|---|---|---|
| EP | 0 747 460 | 12/1996 |
| EP | 914364 | 5/1999 |
| FR | 2766910 | 2/1999 |
| GB | 2284821 | 6/1995 |
| JP | 63131892 | 6/1988 |
| JP | 01030291 | 2/1989 |
| JP | 1302091 | 12/1989 |
| JP | 2153293 | 6/1990 |
| JP | 4045377 | 2/1992 |
| JP | 4097728 | 3/1992 |
| JP | 5296648 | 11/1993 |
| JP | 09229546 | 9/1997 |
| JP | 2002001869 | 1/2002 |
| WO | WO 98/03575 | 1/1998 |
| WO | WO 98/42452 | 10/1998 |
| WO | WO 00/71481 | 11/2000 |
| WO | WO 03/092448 | 11/2003 |
| WO | WO 2004/013063 | 2/2004 |

OTHER PUBLICATIONS

United States Patent Office Action for U.S. Appl. No. 12/563,478 dated Jun. 9, 2010 (10 pages).

United States Patent Office Action for U.S. Appl. No. 12/563,488 dated Jun. 30, 2010 (8 pages).

Declaration Under 37 C.F.R. § 1.132 of Dr. Marie-Isabelle Watchi of Jul. 1, 2005; letter from Richard L. Treanor of Jul. 12, 2005 regarding same.

Treanor, R.L., document entitled "Information Material to the Patentability of Claims 90-124 of U.S. Appl. No. 10/341,525"; letter from Richard L. Treanor dated Mar. 21, 2005 regarding same, 5 pages.

Report on State of the Art issued from Spanish Patent Office for Spanish Application No. 2005/02691 dated Jan. 21, 2008 (3 pages).

Search Report from British Patent Office for Great Britain Application No. 0522434.0 dated Apr. 3, 2006 (1 page).

International Search Report from the International Searching Authority for International Application No. PCT/US03/13416 dated Aug. 4, 2003.

Written Opinion from the International Searching Authority for International Application No. PCT/US03/13416 dated Feb. 6, 2004.

International Preliminary Examination Report from the International Searching Authority for International Application No. PCT/US03/13416 dated Aug. 9, 2004.

European Office Action for European Application No. 03726542.8 dated Aug. 16, 2006.

European Office Action for European Application No. 03726542.8 dated Nov. 10, 2005.

United States Office Action for U.S. Appl. No. 10/982,396 dated Feb. 14, 2008.

United States Office Action for U.S. Appl. No. 10/827,598 dated Sep. 13, 2007.

United States Office Action for U.S. Appl. No. 10/341,525 dated Jul. 15, 2004.

United. States Office Action for U.S. Appl. No. 10/341,525 dated Nov. 9, 2004.

United States Office Action for U.S. Appl. No. 10/341,525 dated Apr. 15, 2005.

United States Office Action for U.S. Appl. No. 10/341,525 dated Dec. 16, 2005.

United States Office Action for U.S. Appl. No. 11/454,247 dated Jun. 18, 2008 (12 pages).

United States Office Action for U.S. Appl. No. 11/346,129 dated Jun. 18, 2008 (10 pages).

United States Office Action for U.S. Appl. No. 10/982,396 dated Oct. 21, 2008 (8 pages).

United States Office Action for U.S. Appl. No. 10/982,396 dated Dec. 1, 2008 (7 pages).

United States Office Action for U.S. Appl. No. 11/346,129 dated Mar. 20, 2009 (12 pages).

United States Office Action for U.S. Appl. No. 11/454,247 dated Mar. 20, 2009 (11 pages).

United States Office Action for U.S. Appl. No. 10/982,396 dated Aug. 10, 2009 (7 pages).

European Patent Office Action for Application No. 07018950.1 dated Jul. 24, 2009 (3 pages).

Partial European Search Report for Application No. 07018950.1 dated Jun. 2, 2008 (4 pages).

Extended European Search Report for Application No. 07018950.1 dated Aug. 25, 2008 (7 pages).
Chinese Patent Office Action for Application No. 200510120206.9 dated Nov. 21, 2008 (9 pages).
French Patent Office Preliminary Search Report for Application No. 0511250 dated Dec. 19, 2008 (4 pages).
Mexican Patent Office Action for Application No. Pa/a/2005/011958 dated Oct. 21, 2009 (2 pages).
United States Patent Office Action for U.S. Appl. No. 12/563,488 dated Nov. 26, 2010 (10 pages).
United States Patent Office Action for U.S. Appl. No. 12/563,478 dated Nov. 23, 2010 (10 pages).
United States Patent Office Action for U.S. Appl. No. 12/563,478 dated Jul. 22, 2011 (10 pages).
United States Patent Office Action for U.S. Appl. No. 12/563,488 dated Jul. 25, 2011 (9 pages).

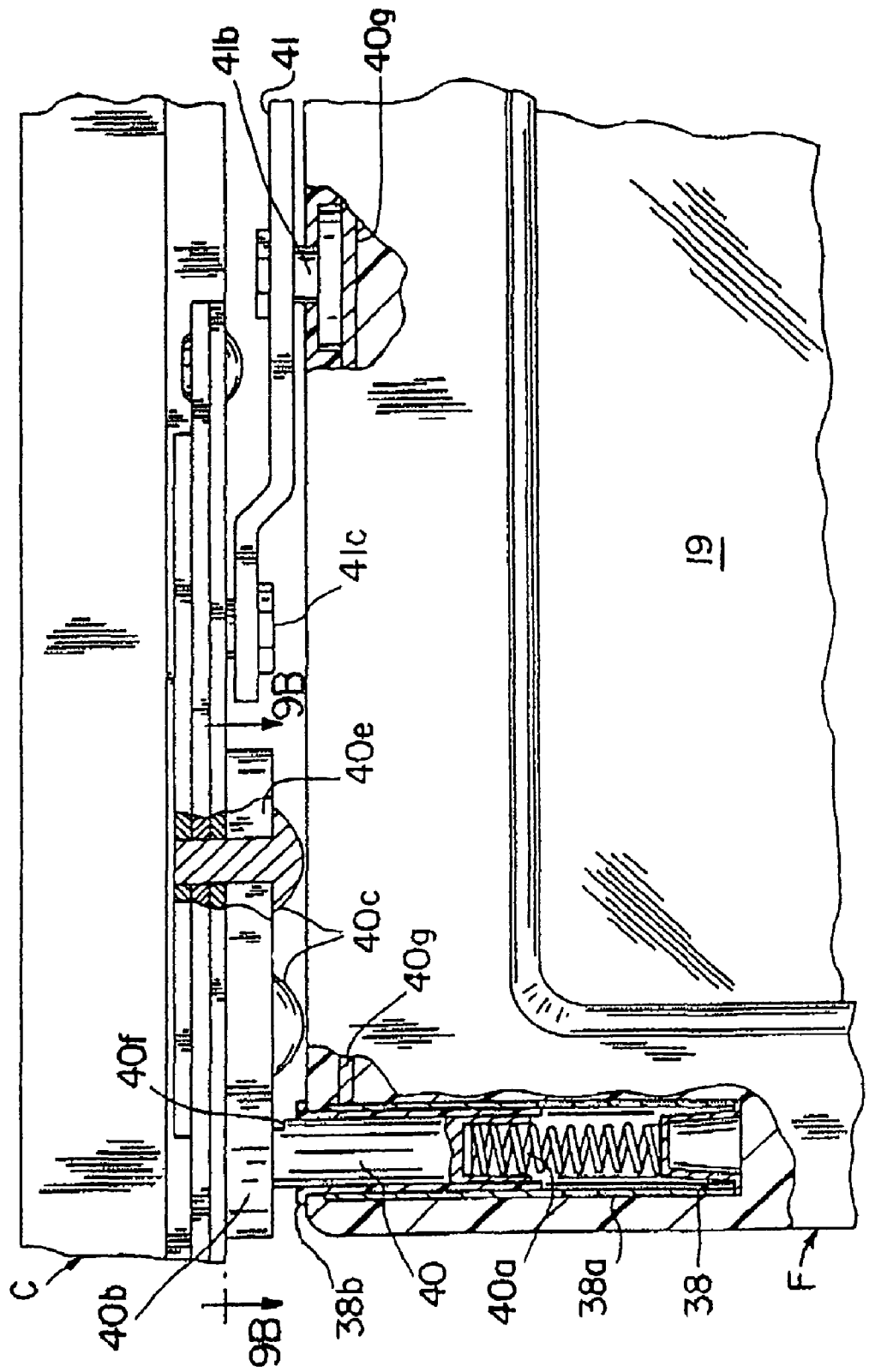

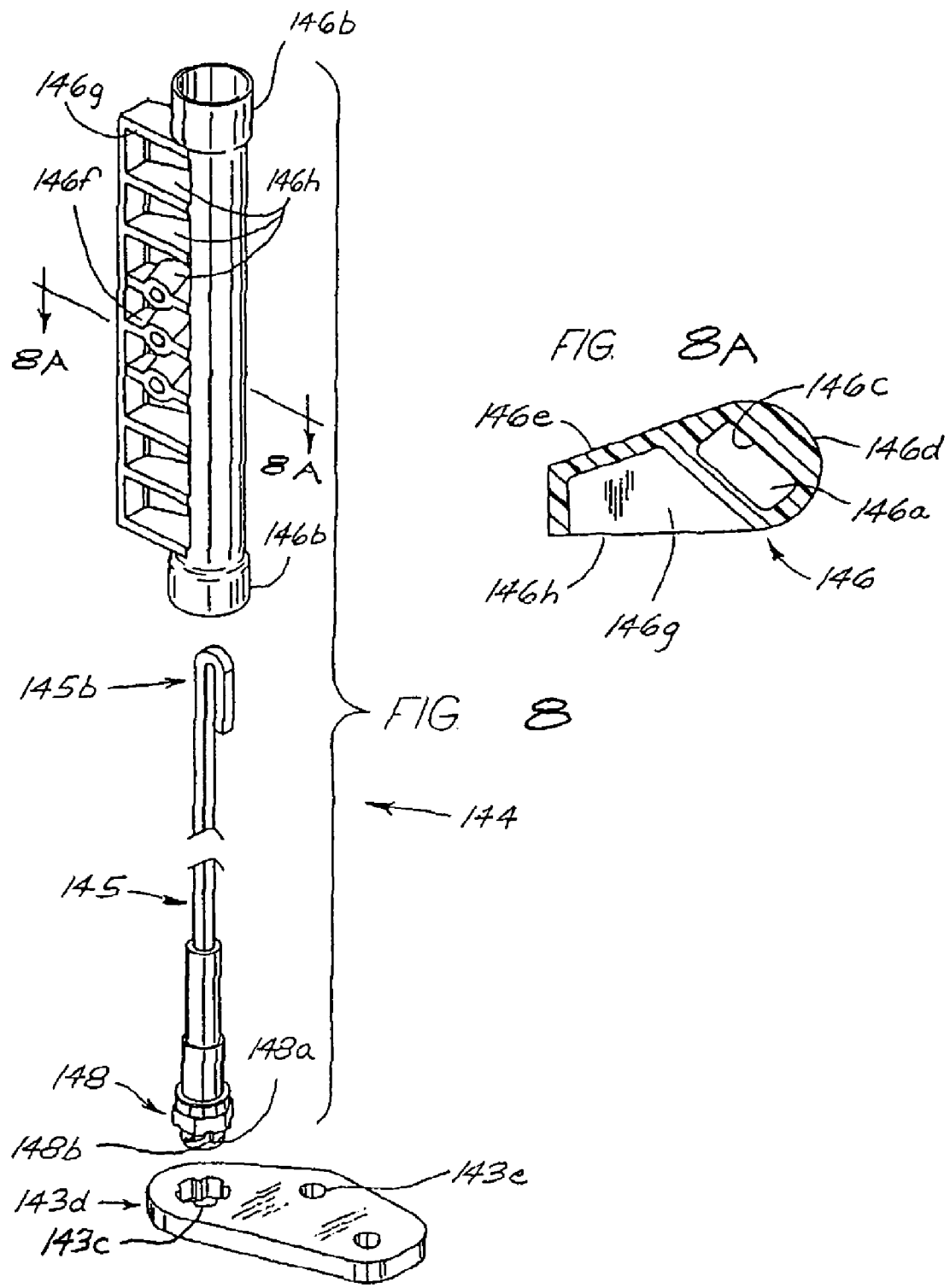

MERCHANDISERS HAVING ANTI-FOG COATINGS AND METHODS FOR MAKING THE SAME

CROSS-REFERENCE TO RELATED APPLICATIONS

This application is a divisional of U.S. application Ser. No. 10/982,396 filed Nov. 5, 2004 now abandoned, which is a continuation-in-part of U.S. application Ser. No. 10/341,525 filed Jan. 13, 2003 now abandoned, which claims the benefit of priority to U.S. Provisional Application No. 60/377,334 filed May 2, 2002; each of these applications is incorporated herein by reference in its entirety.

BACKGROUND OF THE INVENTION

Low temperature merchandisers for frozen foods are designed to maintain product temperatures in the display area less than about 0° C., and more particularly, less than or equal to about −15° C. for frozen food and below about −24° C. for ice cream, which in the past have required cooling coil temperatures in the range of about −24° C. down to about −37° C. Low temperature merchandisers are generally kept at temperatures less than about 0° C., and more particularly below −21° C. Medium temperature merchandisers maintain non-frozen food items, at temperatures generally in the range of about −1° C. to about 5° C.

Multi-shelf reach-in merchandisers for the storage and display of fresh and frozen food products (including ice cream) provide a generally vertical display of the product for greater visibility and product accessibility to shoppers. In order to prevent the escape of cold air into the shopping arena, a transparent glass or plastic front door typically closes the display area of the merchandisers. Glass and plastic are poor thermal insulators. As a result, the doors are conventionally formed by two or three spaced apart panes of glass, defining one or two air spaces to increase the thermal insulation of the door. The air spaces must be sealed for maximum insulating effect, and to prevent entry of moisture into these air spaces. Moisture in the air space condenses on the cold glass (or fogs) and obscures viewing of the product in the merchandiser. In the past, sealing of the air space has been accomplished by forming an "insulating glass unit" or "IG unit" (sometimes called a "glass pack") which consists of opposing glass panes (called "lights" or "lites") separated by a metallic spacer secured by a suitable polymer (e.g., polysulfide, polyisobutylene, etc.). The glass pack is placed in a metal frame to complete the door. Thus, the door assembly process usually has involved two separate steps of forming the sealed air spacers because it has a good strength-to-weight ratio. In addition, metal is an excellent moisture barrier and when used as a spacer seals the air space from moisture for many years. However, metal has two important drawbacks when used in reach-in-doors. The first is that metal is a poor thermal insulator, and the second is that metal is an excellent electrical conductor.

Conventional attempts to attenuate thermal conduction through the metal in the door generally involve placing barriers in the path of thermal conduction. Others have attempted to partially or entirely replace the metal frame with a polymeric material having a substantially lower thermal conductivity. However, it will be noted that these attempts to reduce the metal used in the doors have not eliminated the metallic spacers, nor have they replaced the need for sealing glass lites before forming the frame.

The electrical conductivity of metal has also been a hindrance because in the past electrical power was commonly used to heat one or more surfaces of the glass lites in the door in order to prevent condensation from collecting and obscuring vision through the glass or plastic panes. For instance, the moisture in the relatively warm ambient air of the store readily condenses on the outside of the door if it was not heated. Also, when the door is opened, moisture condenses on the cold inside glass surface. Without heating, this condensation would not clear quickly and so the view of the product in the merchandiser would be obscured. Typically, two types of heaters have been used: (1) an anti-sweat heater wire is applied to the perimeter of the metal frame; and (2) a semi-conductive coating or film (e.g., fluorine-doped tin-oxide) on the inner surface of the outer glass lite in the door is powered by bus bars along opposing edges of the lite to provide an electrical potential causing a current to flow through the electrically-conductive film and produce heat. It has been necessary to keep wiring and bus bars supplying the electric power carefully insulated and isolated from the outer metal door frame and the inner metal spacer. This means that a portion of the heating film had to be eliminated at the edge margin where there would be contact with metal. Avoiding electrical wiring and heating is desired.

Therefore, new ways are sought of preventing or inhibiting fogging of glass or plastic substrates when a door is exposed to a cool environment (as discussed above and in more detail below), and is then exposed to moist air ambient conditions upon being opened. The cool inside surface of a refrigerator door may be exposed to an ambient environment for a few seconds, thirty seconds, or longer, depending on how long the customers or employees keep the door open. In other words, new ways to optimize visibility for the marketing of frozen food products are sought.

SUMMARY OF THE INVENTION

The invention provides a variety of fog-resistant coatings that can be used in a variety of applications. More particularly, the invention provides a variety of refrigerators and merchandisers including glass or plastic substrates having coatings thereon, rendering the substrates substantially fog-resistant.

In one aspect, for example, the invention provides a refrigerator door comprising a substantially transparent substrate having an anti-fog coating on at least a portion thereof. The portion of the substrate may not substantially fog when the portion has an initial surface temperature and is then exposed to a moist air ambient with a dewpoint temperature equal to or greater than the surface temperature for a period of time. The surface temperature may be less than about 0° C. and the period of time may be greater than about 6 seconds.

In another aspect, the invention provides a refrigerator door comprising a substantially transparent substrate having a polyurethane coating thereon. The coating may have a surface tension of less than about 60 dynes/cm.

In yet another aspect, the invention provides a method of manufacturing a refrigerator door having a substantially transparent substrate. The method includes mixing an isocyanate with a polyol to form a mixture, applying the mixture to at least a portion of the substantially transparent substrate, and then curing the mixture. The substrate may be part of a refrigerator door or the substrate may be used to manufacture a refrigerator door.

In yet another aspect, the invention also provides coatings having color stability properties, and methods for making the same.

DESCRIPTION OF THE DRAWINGS

In the accompanying drawings that form a part of this specification and wherein like numerals refer to like parts wherever they occur:

FIG. 7 is a fragmentary elevational view of the upper corner of the reach-in door and door casing, with parts broken away to show details of construction;

FIG. 8 is an exploded view showing a torsion rod adjustment feature of the door;

FIG. 8A is cross-sectional view of FIG. 8, taken along line 8A-8A;

DETAILED DESCRIPTION OF THE INVENTION

A wide variety of refrigerators, refrigerator doors, and merchandisers may be used in conjunction with the present invention. More particularly, the coatings disclosed below may be used in conjunction with existing merchandisers using heaters (as described above), or with merchandisers having no heaters. Examples may include, but are not to be limited to, the refrigerated merchandisers disclosed in U.S. Pat. Nos. 6,148,563 and 6,401,399, each of which issued to Roche, and each of which is hereby fully incorporated by reference. The following is a description of one particular embodiment of a merchandiser or refrigerator, upon which the coatings may be used. As used herein, "merchandisers" and "refrigerators" may be used interchangeably. Again, the coatings may be used with any refrigerators or merchandisers, and should not be limited in application to the following example.

Figure 1:
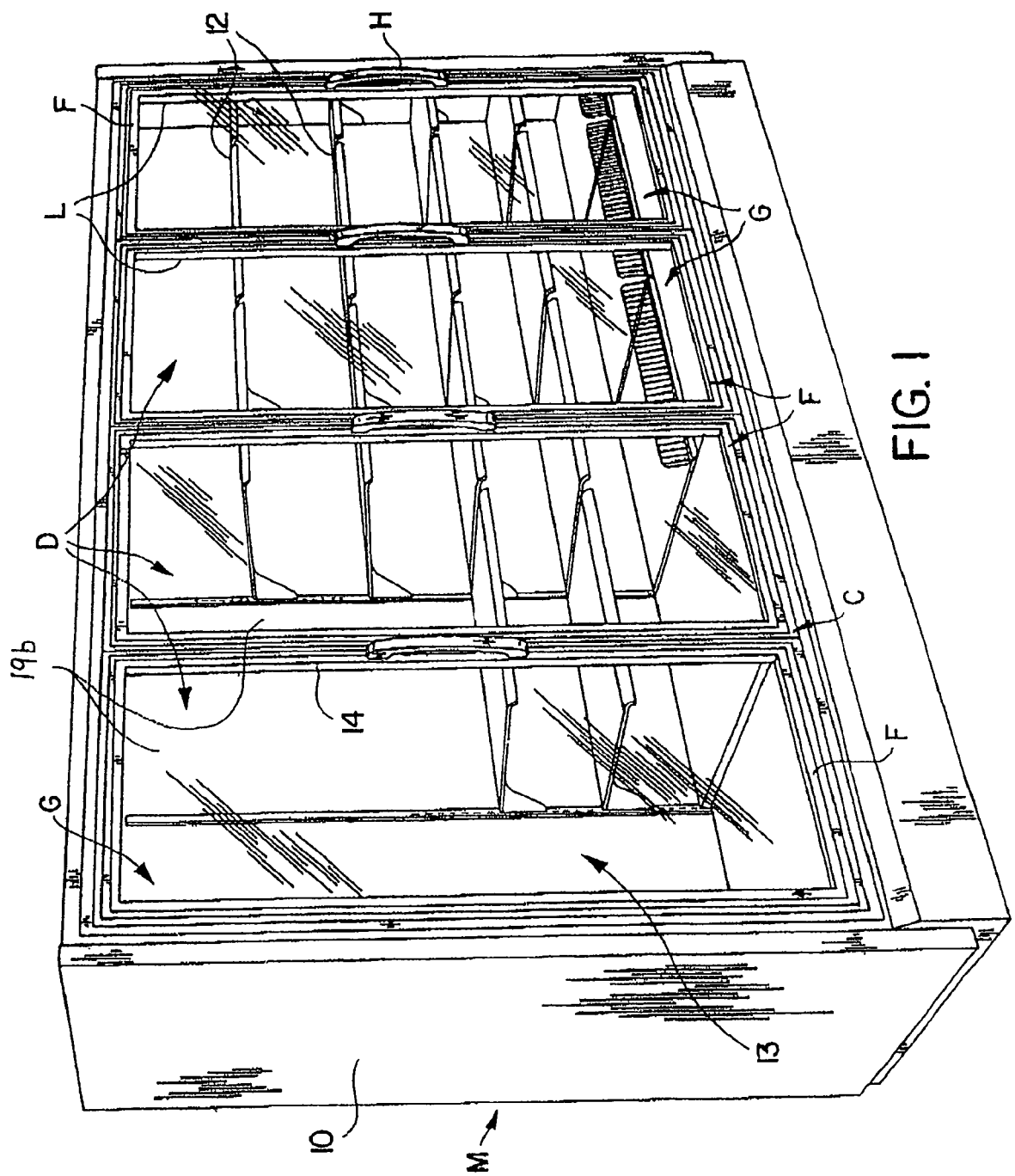
FIG. 1 is a perspective view of a refrigerated reach-in merchandiser.
Figure 2:
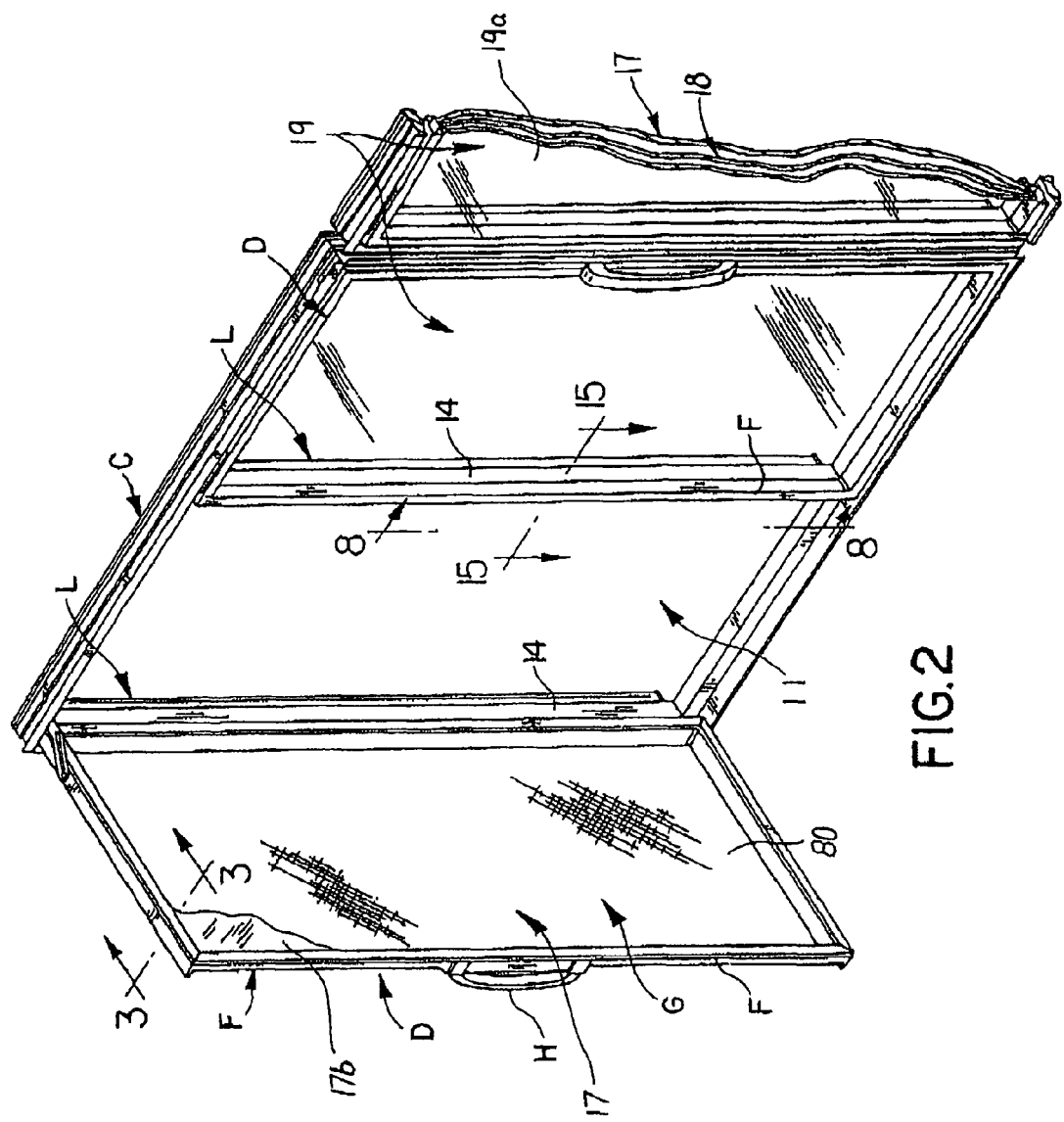
FIG. 2 is a fragmentary perspective view of reach-in doors and associated door casing of the merchandiser.

FIG. 1 shows one example of a low temperature reach-in merchandiser, which is indicated generally at M for disclosure purposes. The merchandiser has an outer insulated cabinet having a front opening 11 (FIG. 2) defined by a cabinet casing C and closed by doors D hingedly mounted on the casing C. More particularly, the reach-in door D is mounted on the door casing C of the refrigerated merchandiser M for swinging motion between a closed position in which the door covers the encased front opening 11 in the cabinet 10 (center door in FIG. 2), and an open position for access to the refrigerated display zone 13 within the cabinet (left door in FIG. 2). Multiple shelves 12 are selectively provided in the cabinet to hold and display product in the refrigerated interior product zone 13. As shown in FIG. 2, the doors D are opened by handles H to access the refrigerated zone 13 inside the merchandiser where product is held for display. The refrigerated zone 13 may be illuminated by lighting L mounted on mullions 14 of the door casing C. These lights L are covered by diffusers 15 which spread the light within the merchandiser display area 13, as will be described more fully hereinafter.

Figure 3:
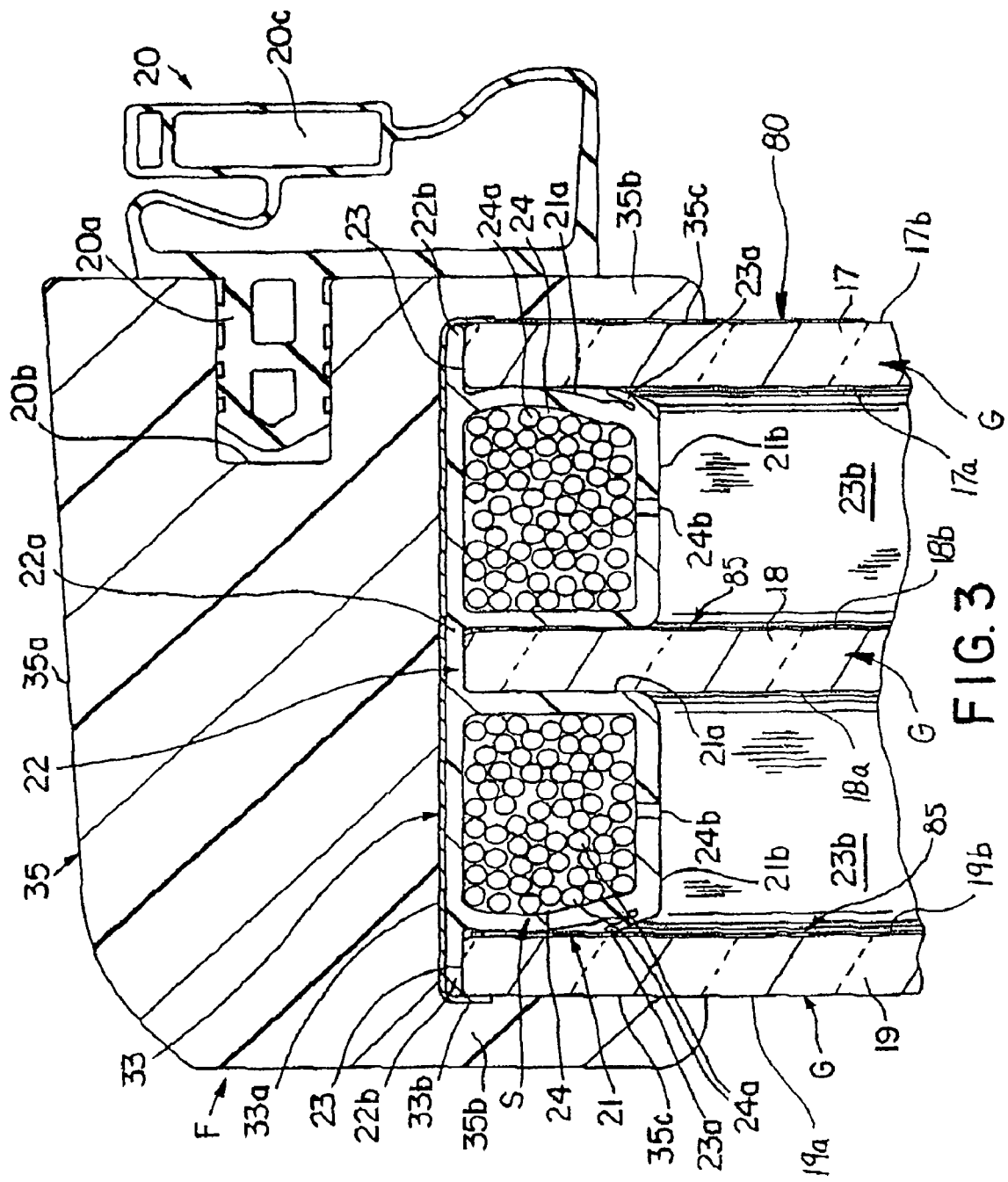
FIG. 3 is a greatly-enlarged fragmentary sectional view of a three lite reach-in door taken in the plane of line 3-3 of FIG. 2, and illustrating a preferred embodiment of a no-heat door having both a hydrophilic film and low-E glass.
Figure 9:
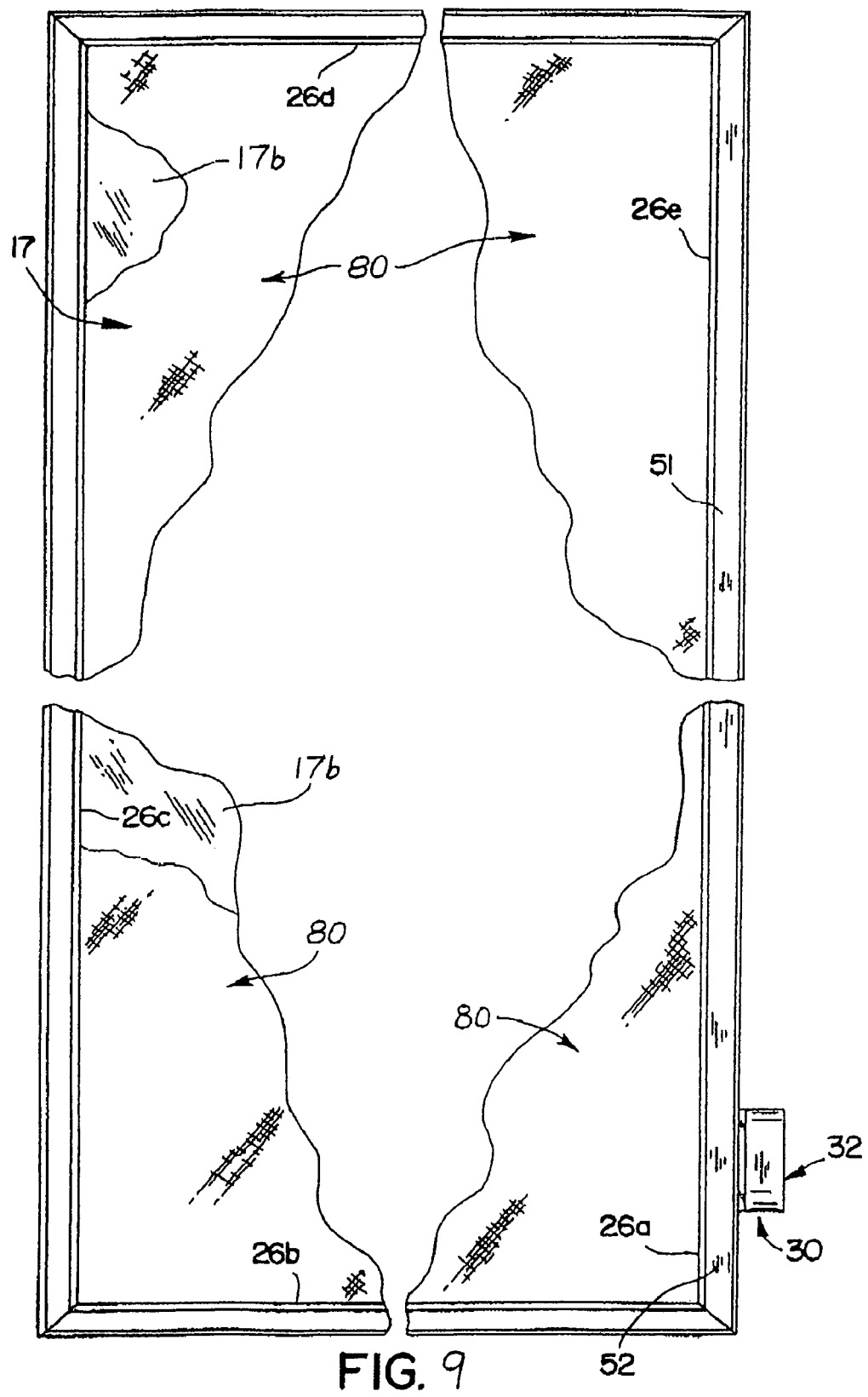
FIG. 9 is a view of the spacer as assembled around the glass lites, and is broken away to illustrate the no-heat coating applied to the exposed surface of the inner lite.
Figure 10:
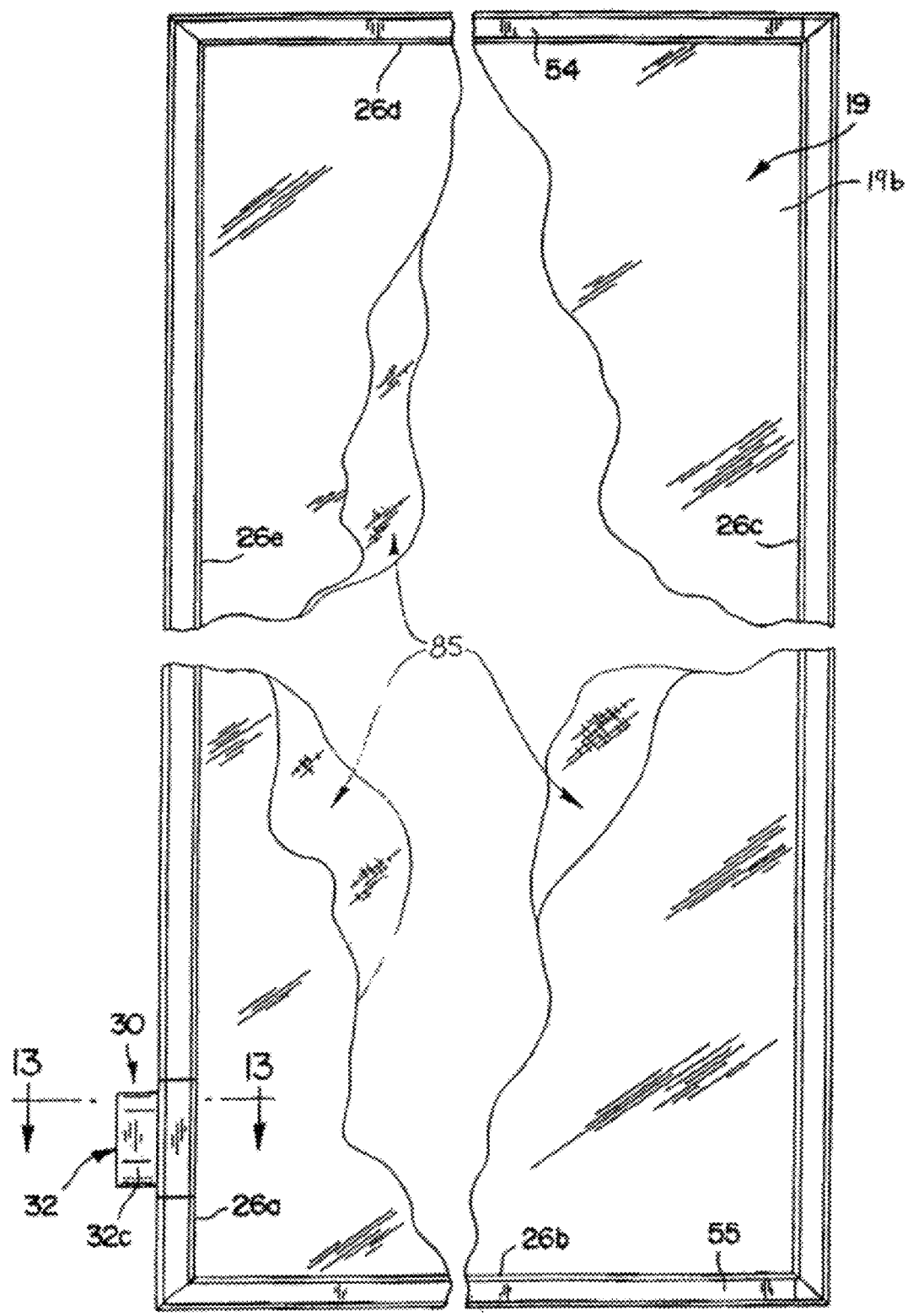
FIG. 10 is a view of the spacer and glass lites from the side opposite to FIG. 9 to show the outer lite exposed to the ambient environment, and is broken away to illustrate a low-E coating applied to the inner surface thereof.

FIG. 3 shows in more detail the low temperature door including three panes, lites or substrates G of glass, namely an inner lite 17, a middle lite 18 and an outer lite 19 that are assembled and held together by the molded frame F. In a typical three lite panel, the glass surfaces are generally sequentially numbered from 1 to 6 starting from the outermost ambient store or customer side. These correlate to the three lites 19, 18 and 17 as surfaces 19a, 19b, 18a, 18b, 17a and 17b, respectively (FIG. 3). The precise number of lites may differ, but typically at least one, and more typically, at least two lites may be used in the door. The anti-fog coatings described herein may be applied using application techniques discussed in more detail below on any portion of any of the three lites. Typically, however, the anti-fog coatings described herein are applied on the exposed inner surface 17b of the inner lite 17 next to the low temperature product area 13 (FIGS. 2, 3 and 9).

The refrigerators used herein may also selectively utilize low-emissivity (Low-E) glass in combination with the inner glass 17 having an anti-fogging film 80. Use of low-E is not limited to this particular embodiment. One or more of the lites (17, 18, or 19) may comprise low-E glass or have low-E coatings thereon (as described in more detail below), and in the three-lite door D of FIG. 3 both lites 18 and 19 may be provided with low-E coatings 85. Although any of the substrates 19a, 19b, 18a, 18b, 17a, 17b may comprise low-E glass or be coated with a low-E coating (i.e. have low-E properties), most typically at least one of substrates 19b, 18a, 18b, and 17a will have low-E properties. In one example, substrates 19b and 18b may have low-E properties, while in another example, substrate 18a and 17a may possess low-E properties. Alternatively, substrates 19b and 17a may comprise low-E glass or have a low-E coating thereon. The lites may or may not be heated. Accordingly, the efficacy of the door to resist fogging and/or to maintain high transparency may depend on the character and application of the surface coating described above (together with the no-metal door frame now to be described).

Figure 4:
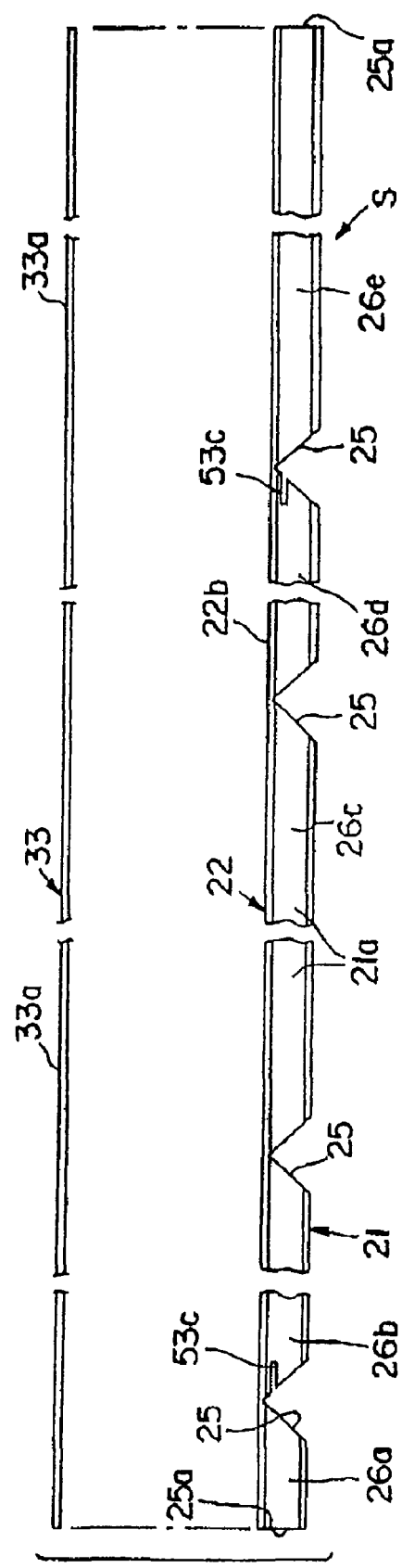
FIG. 4 is a fragmentary edge-on elevational view of a spacer member for the reach-in doors, laid out flat and showing a metal moisture sealing tape exploded above the spacer.

The glass or plastic lites are held in parallel spaced apart, generally face-to-face positions relative to each other by a spacer S to form a basic glass panel subassembly preliminary to molding the frame F. Referring to FIGS. 3 and 4, the spacer may be made of polypropylene, or other suitable material, which has low thermal and electrical conductivity in a three lite door, two separator or spacer body portions 21 of the spacer S are inwardly disposed between adjacent pairs of the glass lites (i.e. 17,18 and 18,19), and these portions 21 are joined together by an integral, unitary outer wall portion 22. The number of separator portions depends upon the number of glass lites to be spaced by the separator portions. Each separator or spacer body portion 21 has a generally D shaped or rectangular configuration with spaced side walls 21a connected by a free inner wall 21b opposite to the outer wall member 22. The side walls 21a are engaged in surface contact with respective glass lites (17,18 or 18,19) adjacent to the free edge margins 23 thereof. In addition, a sealing lip 23a may be provided along the juncture of the outward side wall and free wall (21a, 21b) of each spacer body 21 as an additional assurance of continuous sealing engagement of the spacer bodies 21 with the respective inner surfaces 17a,19b of the outermost glass lites 17,19. Continuous sealing contact of the spacer around the lites prevents molded material from encroaching the sealed air spaces 23b between adjacent lites during formation of the door frame F.

The planar-outer wall 22 forms one wall of each spacer body 21 and has a connecting web 22a between the spacer bodies and also projects laterally outwardly to form flanges 22h at the outer longitudinal edges of the spacer. The laterally projecting flange portions 22b abut against the outer peripheral edge margins 23 of the inner and outer lites 17,19 in the door for additional sealing and also to maintain the spacer in position under frame molding pressure. Still referring to FIG. 3, the spacer bodies 21 are typically hollow (24), but filled with a suitable desiccant material 24a (e.g., molecular sieve) for trapping moisture.

Referring to FIG. 4, the spacer S is a flat extruded strip with four angle-cut or chamfered notches 25 being formed in the spacer body 21 corresponding to the four corners of the basic glass panel for the door D. The spacer S forms an outer peripheral covering for the three lites 17, 18, 19 by coming together at the corners (in the fashion of a miter joint) when the spacer is assembled around the lites so that the spacer segments extend continuously along the sides and mate together through the corners. The spacer S is constructed with five sequential segments identified in FIG. 4 as 26a-26e, and being interconnected at the angle cuts 25 by the continuous outer wall 22. Clearly, when the spacer S is folded or bent during assembly with the glass lites, the two alternate short segments 26b and 26d will be in opposed relation and form the short horizontal top and bottom walls of the panel. The long segment 26c will define the long vertical wall margin of the panel that will become the outer free (unhinged) handle margin of the door, and the two remaining segments 26a and 26e at the free ends 25a of the strip will close the inner hinged vertical margin of the panel and may be joined together by a spacer locking key 30.

Figure 5A:
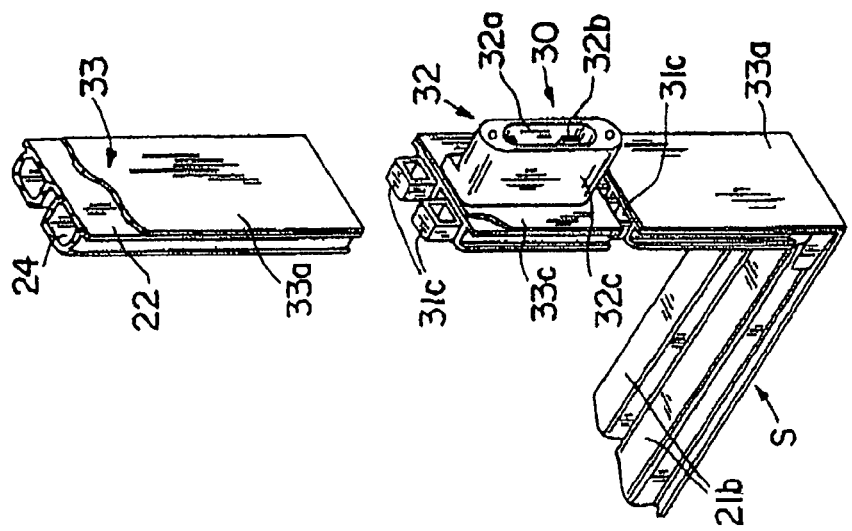
FIG. 5A is a fragmentary perspective view from the opposite side from FIG. 5.
Figure 5:
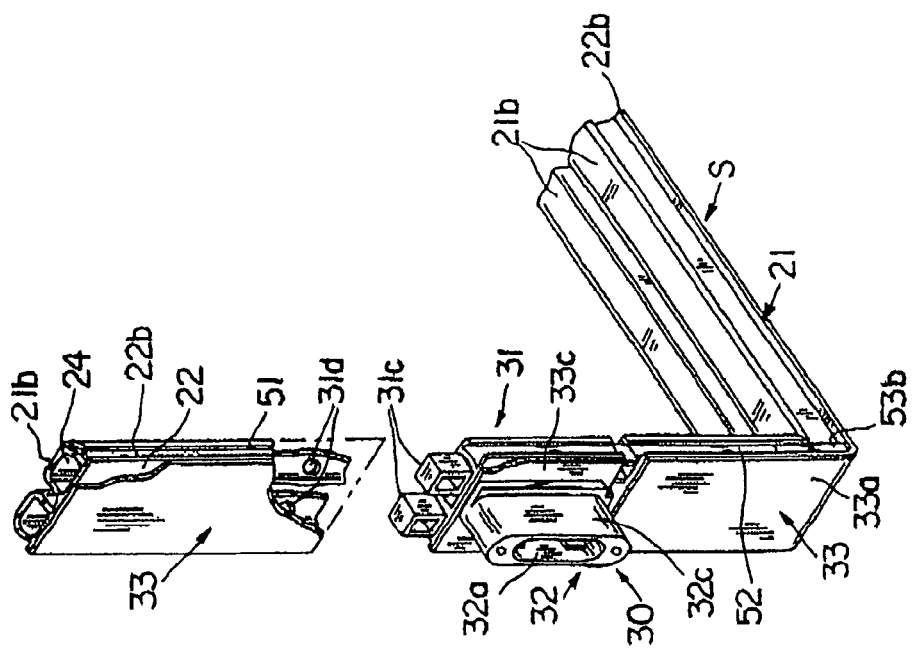
FIG. 5 is a fragmentary perspective view from a corner of the spacer as installed on the glass lites, and partially exploded to illustrate the assembly of the spacer ends by a spacer locking key for the door.
Figure 6A:
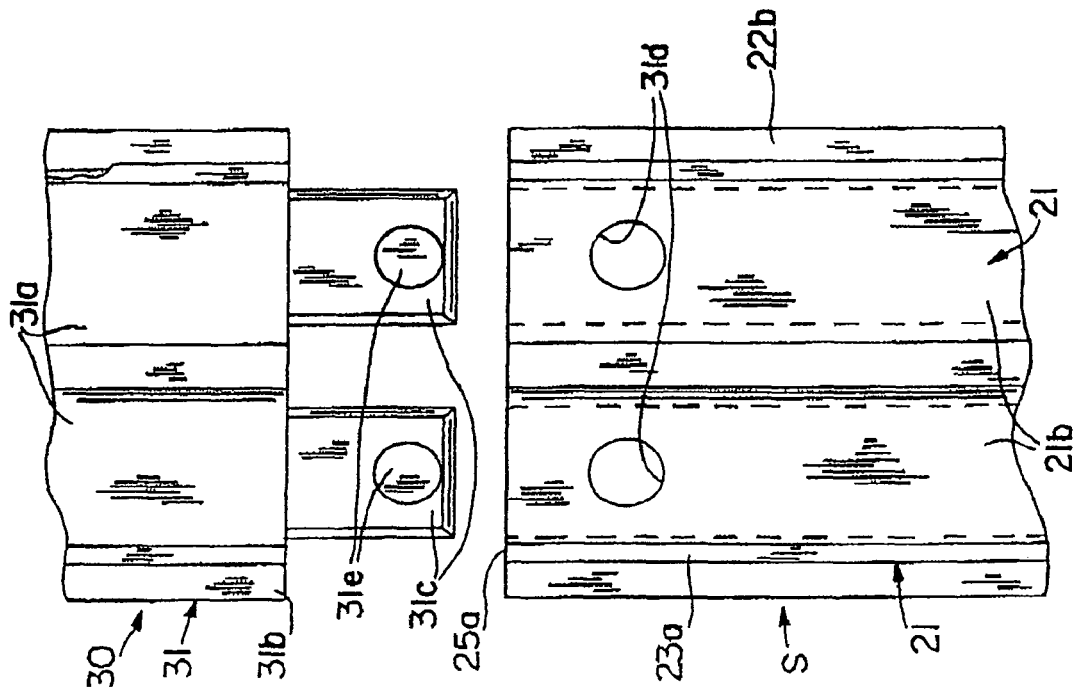
FIG. 6A is a greatly enlarged fragmentary view of the spacer locking key taken from the right side of FIG. 6.
Figure 6:
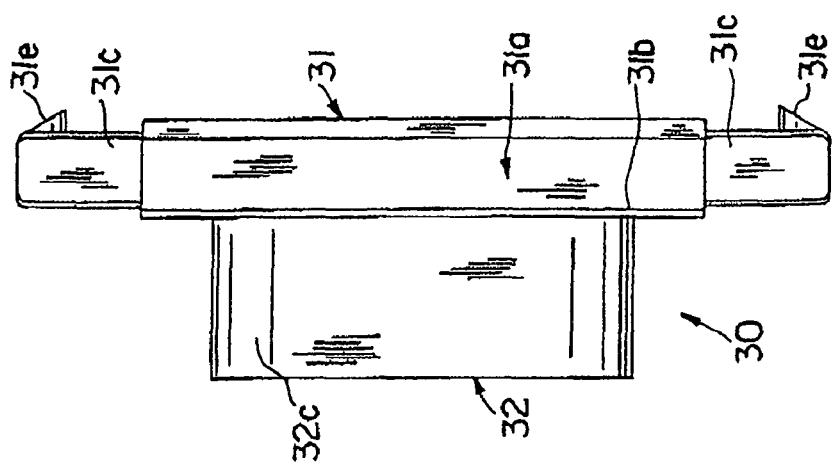
FIG. 6 is a side elevation of the spacer locking key for the spacer.

As shown best in FIGS. 5, 5A, 6, 6A and 9, the locking key 30 has a main assembly or locking body section 31 (and originally included an electrical connector section 32 for conventional electrical heating of the inner lite 17). The main locking body section 31 is constructed and arranged to mate with and join the free ends 25a of the spacer S, and it is configured with spaced separator body portions 31a and a connecting wall 31b with outer flanges to match the configuration of the spacer 21. Connector blocks or keys 31c project longitudinally from both ends of the separator bodies 31a, and these are sized to fit into the hollow cavities 24 of the spacer bodies 21 (FIGS. 5, 5A and 6A). In addition, the inner wall 21b of the spacer bodies 21 have an orifice 31d adjacent to their free edge 25a, and each key 31c has a chamfered locking detent 31c to snap lock into these holes 31d and form a secure interlock therewith. The reach-in door D incorporated a heated glass lite (17) requiring an electrical hook-up that was accommodated through an electrical connector section 32 and leads 50, 50a to connectors and bus bars constructed and arranged on the door to provide the electrical heating field across the inner lite 17. However, since a non-heated door that still has excellent anti-fogging or rapid clearing action may be provided, it is possible to eliminate the electrical hook-up for heating the inner panel 17 including the protruding electrical connector section 32.

The preferred reach-in door embodiment includes moisture barrier tape 33 which is applied to the outer surface of the outer wall 22 and flange 22b. This tape 33 may be an aluminum foil tape or, may be a thin substantially non-metallic tape of moisture-impervious metalized-polyester/polyethylene film that is electrically non-conductive. Referring to FIGS. 3, 4 and 5, the tape 33 has a main body 33a that covers the entire outer wall 22 of the spacer S and has an edge wrap that extends around the outer flange segments 22b and, preferably, onto the adjacent outer surfaces of the inner and outer lites 17,19. Thus, as shown in FIG. 4, the tape 33 may be provided as a unitary one-piece main body sheet 33a with integral edge wrap portions (33b) or as a series of main body sheets or segments corresponding to the five sections 26a-26e of the spacer strip 21. The foil or film sheets 33a may be applied to cover the outer wall 22 throughout its length so that the outer spacer wall surface is covered before it is assembled with the glass lites 17-19. In that event, the width of the tape or film would be only slightly greater than the width of the outer wall 22. The tape may wrap around and under the flanges 22b and would be in contact with the peripheral edge of the outer lites 17,19 when installed. The locking key 30 is also covered with the same film or tape 33c. The tape 33 provides a non-structural moisture barrier to inhibit significant transfer or migration of water vapor into the spaces 23b between the lites.

As indicated, the basic glass panel with assembled lites, spacer and moisture barrier tape is encased in the outer molded door frame F. As shown in FIG. 3, this frame F has a main body portion 35 that surrounds the periphery of the glass panel subassembly, and has an outer wall margin 35a and side walls 35b that extend inwardly and capture the outer glass surface margins (35c) of the inner and outer lites 17,19.

In use, the reach-in door D is mounted on the door casing C of the refrigerated merchandiser M for swinging motion between a closed position in which the door covers the encased front opening 11 in the cabinet 10 (center door in FIG. 2), and an open position for access to the refrigerated display zone 13 within the cabinet (left door in FIG. 2).

Figure 7A:
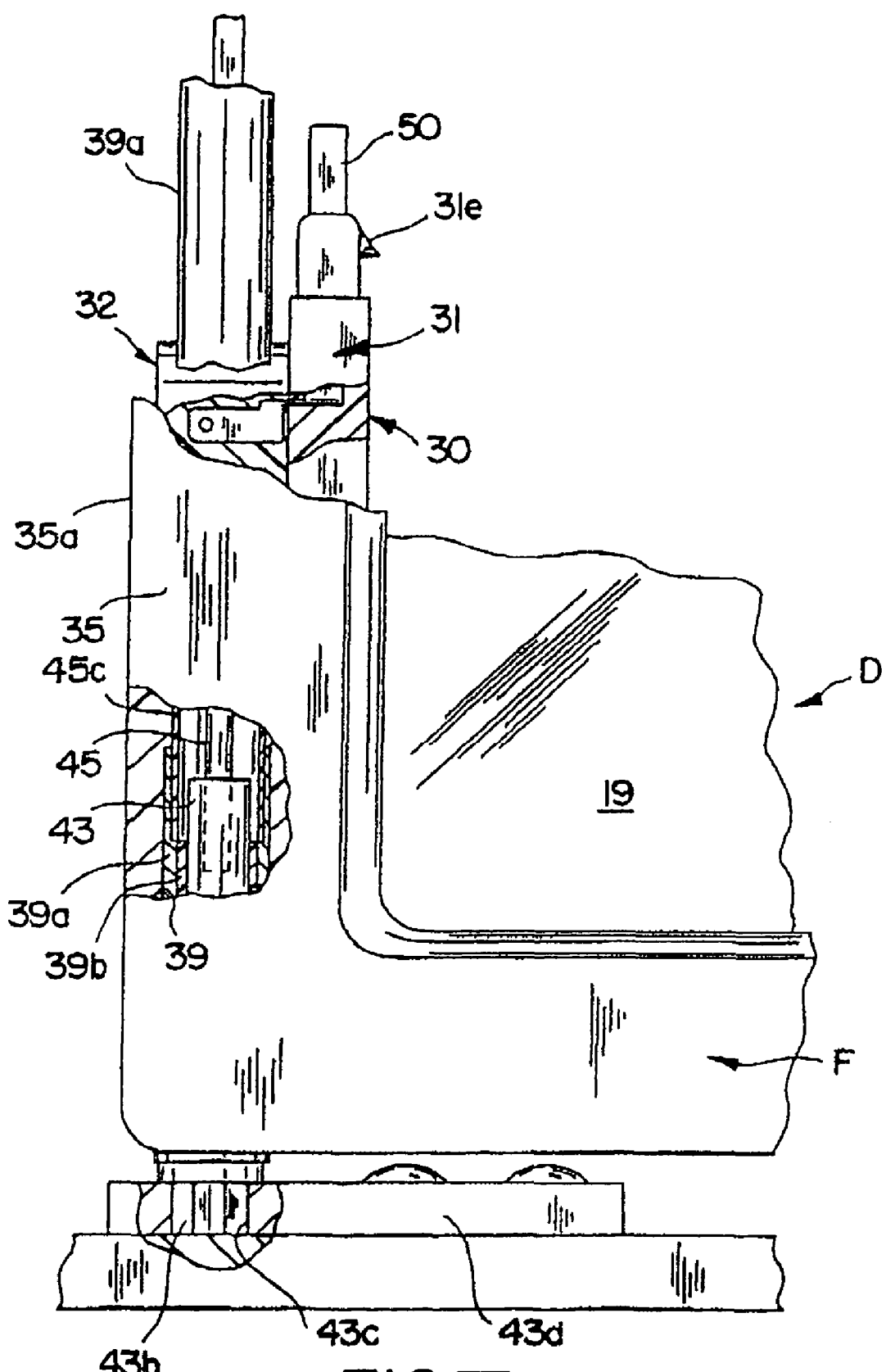
FIG. 7A is a fragmentary elevational view of the lower corner of the reach-in door and door casing, with parts broken away to show details of a torsion rod and lower hinge construction.

Referring to FIGS. 7 and 7A, the hinge for mounting the door D are accommodated during the frame molding process by forming an upper cylindrical opening 38 receiving a metal sleeve or bushing 38a and a lower cylindrical opening 39 receiving a sleeve or bushing 39a. After completion of molding the frame F around the glass lite subassembly, the upper bushing 38a preferably receives a plastic sleeve 38b (FIG. 9) in which an upper hinge pin 40 is slidably received for free turning movement so that this hinge pin is free of any fixed connection to the molded frame F. The bushing 38a contains a compression spring 40a which biases the pin 40 for vertical outward movement relative to the frame F so that the pin projects upwardly to be received into an opening in an upper mounting plate 40b attached by bolts 40c to the door casing C of the merchandiser M. The bolts 40c are received through elongate slots 40e. Located at offset positions in the upper mounting plate 40b to permit the upper mounting plate 40b to be moved laterally on the door casing. In this way the pivot axis of the door D can be adjusted for optimum alignment within the casing opening.

The upper bushing sleeve 38a for the upper hinge pin 40 may be part of an upper reinforcing member 40g molded into the door frame to rigidify and strengthen the frame E in the region of the upper door mounting connection. The member 40g also provides a hearing portion (41a) to receive a pivot pin 41b to connect one end of a hold open bar 41 to the door. The hold open bar 41 limits the maximum angle of opening of the door relative to the merchandiser, and functions to hold the door fully open when needed (e.g., as for stocking the merchandiser).

As shown in FIG. 7A, the lower hinge pin 43 is provided for during the frame molding process by forming the lower cylindrical opening 39 for the bushing 39a, and after the molding process a plastic sleeve 39h is received in the metal bushing as a bearing for the lower hinge pin 43 which is free of any fixed connection to the molded frame F. The lower bushing 39a may be secured to a lower reinforcing member 43a for reinforcing the frame F in the door mounting area where the major weight of the door I) is translated to the casing C. The lower end 43b of the hinge pin projects outwardly below the frame F and is hexagonal (or otherwise shaped) to have a non-rotational fit into a complementary opening 43c in a casing bearing plate 43d bolted at 43e to the casing C, see FIG. 9A. Thus, the door D will turn on the lower hinge pin 43 as it is opened and closed while the lower hinge pin is stationary relative to the cabinet casing C.

FIGS. 8 and 8A show torsion rod assembly 144 for self-closing of the door. The assembly 144 is accommodated in the vertical opening 39 in the molded door frame F. The assembly 144 includes an upper torsion housing member 146 molded into the frame F, a torsion rod 145 having an upper hook-end 145b received in the housing member 146 and a lower end secured on a torque control member 148, and a lower bearing plate 143d having a toothed ratchet opening 143c therein. In this embodiment the vertical opening 139 is created with the sheath 139a at the time of molding the door frame, as before. However, the upper housing member 146 is constructed and arranged to receive the upper hook-end 145b of the torsion rod with a sliding fit in the final assembly 144. Thus, the housing member 146 is configured to provide a tubular section 146d with a vertical opening 146a having an end section 146b to accommodate the sleeve 139a and an extended opening 146c of rectangular cross-section in which the hook-end 145b is received in a fixed (relatively non-rotational) relationship with the door D per se. The housing member 146 is also formed with an integral rigid side section 146e extending laterally from the tubular section 146d to act as an anchor in the molded frame F. The hook-end 145b is bent over to facilitate holding the torsion rod 145 from turning about its axis at the upper end within the frame F. By bending the rod 145 back upon itself, the effective width of the rod is doubled at the hook-end 145b. The two contact points of the hook-end 145b which engage the walls of the housing member 146 within the extended opening 146c are spaced apart for additional mechanical advantage in resisting turning about the axis of the torsion rod 145. Although bending of the torsion rod 145 to form the hook-end 145b is shown, the same effect could be achieved by initially forming the rod with a flat or wider upper (not shown). For example, the upper end of the rod 145 (at least the portion received in the extended opening 146c) could be flattened.

The housing member 146 is designed for universal use with right-hand or left-hand doors and is double-ended with a center web 146f extending across the side section 146e and through the center of the tubular section 146d intermediate of the ends (146b). Thus, the anchoring housing member 146 can be oriented for the side section 146e to extend in either direction. The side section 146e is constructed with a series of pockets or recesses 146g defined by spaced webs or ribs 146h to receive a mass of mold material and work with the forces on the housing member to prevent weakening or destruction of the molded frame, as exerted by the torsion rod 145 during opening and closing of the door D through continuous use over long time spans.

The torque control member 148 on the lower end of the torsion rod 145 has a saw-toothed ratchet 148a with typical vertical lock edges 148b and sloping cam surfaces 148c. A hexagonal or like nut 148d is integral or locked to the ratchet 148a for selective pre-tensioning of the self-closing torque applied to the door. More specifically, prior to insertion of the ratchet 148a into the opening 143c in the lower bearing plate 143d, the nut 148d is turned to twist the torsion rod 145 within the bushing 39a. The ratchet 148a is then inserted into the opening 143c, with the teeth of the ratchet engaging the teeth of the opening to hold the torsion rod 145 in a pre-tensioned configuration.

It will thus be seen that the molded door D may eliminate metal framing and provides better insulation and thermal properties in closure of the low temperature product zone 13. In order to keep the door lites clear of exterior condensation and/or to clear interior condensation after the door has been opened, one of the door lites and the inner surface of the outer Tile 19 may be was heated by applying an electrical potential across a transparent, electrically conducting film on that inner surface. Alternatively, only the inner surface 17a of the inner lite 17 would be heated and thus the electrically conductive film would be applied to that surface (17a). In addition, the space between adjacent lites may be filled with a dry gas, such as argon or krypton, having low thermal conductivity. The increased thermal resistance of that arrangement may reduce concern over external condensation. Thus, the heated surface was shifted to the inside lite where it was still needed for door clearing. It was also believed that that embodiment was more energy efficient since only about half the power was required to clear the door in a commercially acceptable time.

The reach-in door D of this embodiment may or may not have electrical heat applied thereto, but achieves commercially acceptable performance levels utilizing an anti-fogging coating (described in more detail below). The coating may be applied to any portion of the lites 17, 18, 19, and may be applied to other interior portions of the refrigerator, e.g., shelves or mirrors. Typically, the coating is applied on the innermost surface 17b of the inner lite 17 facing the product zone 13. The anti-fog coatings may be used in conjunction with low-emissivity (low-E) glass or coatings. Use of low-E glass or coatings on the lites is not required, however. A variety of application techniques that are well-known in the art, some of which are discussed below, may be used on the doors.

Again, the anti-fog coatings described herein are compatible with any refrigeration units having glass, plastic or similar substrates, especially when those substrates are substantially transparent. The anti-fog coatings work particularly well, however, when used in conjunction with one or more other lites (e.g. 18 and 19) at least partially made from or comprising low-E glass or coated with a low-E coating. The low-E glass may be selected to meet two primary criteria: 1) high reflective capability as to the infrared spectrum (thereby rejecting invisible radiant heat); and 2) high visibility transmittance (so that it does not obscure or cloud visibility through it). Low-E coatings typically are "interference" coatings of about one-fourth wave length with a emissivity rating from "zero" identifying a perfect infrared reflector to "one" which would be the least reflective and undesirable material. There are a large number of such glass coating materials having varying low-emissivity properties. Clear window glass transmits radiation between 0.3 to 2.7 micron wavelength. 95% of the energy in blackbody radiation is contained within this spectrum. The visible spectrum is 0.4-0.7 microns. Infrared radiation is 0.7 to 1000 microns. Thus, to reduce radiant heat gain in a refrigerator, it is desirable to reflect the non-visible 0.7 to 2.7 micron infrared radiation. Emissivity is the inverse of reflectivity. Thus, a perfect emitter has an emissivity of 1 and reflects nothing. Low-E glass and low-E coated glass or plastic as used herein are meant to refer to glasses or plastics that are designed not to emit (thus reflect) radiation above 0.7 microns. This may be achieved by applying a thin coating (typically ¼ the desired wavelength) to the surface of the glass or plastic. More specifically, the low-E glasses and plastics tend to possess a hemispherical spectral emissivity over 0.7, and more particularly from 0.7 to 2.7. Typically, several layers are used to reflect the greater percentage in the 0.7 to 2.7 micron range. The low-E surfaces or coatings may have a visible transmittance of about 70% to about 90%.

Low temperature and normal temperature merchandisers are typically used in the storage and display of food products merchandised in a supermarket or other food store having a temperature and humidity controlled ambient atmosphere. The ASHRAE design ambient for the best shopper comfort zone is about 24° C. DB (dry bulb) with 55% RH (relative humidity). A low temperature merchandiser (M) with a product zone (13) temperature of −21° C. will result in a surface temperature of −18° C. on the inner surface 17b of the inner door lite 17. The resulting gradient across the door to the outer lite 19 depends, in part, on the use of low-E glass and store environment, but in the above example of 24° C. DB and 55% RH, the resultant outer lite surface (19a) will have a temperature of about 15° C. to 18° C. Thus, it will be seen that there is some transference of heat across the door D between the store ambient and the cold product zone 13 even when the door is closed and the zone 13 is shielded from the store. It is also clear that the ambient heat and humidity will impinge on the cold inner lite surface 17b when the door is opened by a customer, the immediate effect being to tend to cause water condensation (and fogging) on the inner cold surfaces of the door (and adjacent casing and into the product zone).

Generally, the door D has an anti-fog coating applied to the exposed inwardly facing surface 17b of the inner glass lite 17, which may obviate the need for any electrical heating of any glass lite. Hydrophilic coatings or films may act to increase the surface energy of the substrate, thereby causing water condensate to sheet out on the surface (as opposed to beading up). Thus, the moisture condensation that occurs on this exposed cold inner lite surface 17b when the door D is opened, presents a transparent see-through phenomenon as distinguished from a vision obscuring fog, and rapidly clears. Typical examples of anti-fog hydrophilic coatings (which may differ from the coatings having a hydrophobic surface and hydrophilic interior described below) are hydrophilic polyester films and hydrophilic titanium dioxide pyrolic coatings for glass that are compounded and applied to meet certain favorable performance criteria as compared with typical heated doors.

As indicated, it is desirable that coatings set forth herein produce a substantially-no-fog result on the inner glass surface 17b during the door opening periods of most shoppers, and this efficacy is enhanced by the use of low-E glass 85, particularly, for the middle and outer lites 18 and 19. The door opening periods may range from a second or two to several minutes or much longer. Although the use of two low-E coatings is disclosed on surface 19b (#2) of the outer lite and surface 18b (#4) of the middle lite, it will be understood that the two low-E coatings may be applied to surfaces 2 and 5 or surfaces 3 and 5 with equal effectiveness. Further, in instances where the merchandiser M is placed in higher humidity ambient environments, there will be a greater moisture condensation on the film surface, in the case of the hydrophilic coatings, which will sheet or spread out evenly and become a no-fog, transparent layer of moisture due to the high affinity of hydrophilic materials for water vapor. Such a moisture layer will be attracted to the colder interior of the merchandiser and rapidly and evenly absorbed or evaporated therein.

Typically, the hydrophilic materials of the invention produce a hard, smooth impervious coating as through molecular bonding at its interface with the glass lite 17. A hardness of about 2 to 8H (pencil hardness) is desirable. The hydrophilic films depress the freezing point of that surface to prevent freezing.

In addition to the hydrophilic coatings, a wide variety of highly scratch-resistant coatings having a hydrophobic surface and hydrophilic interior may also be used to inhibit fogging on the substrate of the refrigerator or merchandiser. These coatings may be applied in a similar fashion as discussed above to inhibit fogging, thereby optimizing visibility for the marketing of frozen foods. For example, polyurethane compositions may be used. Polyurethane compositions of the present invention may be non-fogging and water repellent, and may maintain excellent abrasion resistance, clarity, and adhesive properties on most plastics and glass. A hydrophilic layer of the composition possesses a water-repellent surface due to the unique material combinations put forth in the invention. Hydrophilic and water-repellent properties are generally achieved without the addition of fog-preventing surfactants or need for chain extenders. This makes the anti-fog composition superior to other materials in anti-fog properties. The composition system may comprise one or more of the following: an isocyanate prepolymer having reactive or blocked isocyanate groups or a blocked isocyanate, a water-soluble or water dispersible polyol, any compatible organic solvents or water (and emulsifier, if water-based), any required catalysts, and rheological additives. The invention can be also cast in a solvent-free state in order to produce a film, or casting molding composition.

The coatings, which are the result of curing mixtures that have been applied to a substrate, tend to possess permanent, non-fogging properties and remain hard enough to be used in the everyday situations required in applications such as refrigerator doors, shelves and mirrors within a refrigerator, other interior portions of a refrigerator, optical lenses, goggles, shields, sunglasses, windshields, sunroofs, shelves, mirrors etc. These coatings work particularly well when used in conjunction with the low-E glass described above, particularly, in a merchandiser application. By combining a porous, hydrophobic surface with a hydrophilic base polymer, it is possible to obtain a composition possessing excellent anti-fog characteristics and surface hardness.

Composition hardness and adhesive properties may also be significantly improved in order to adapt the coatings to especially difficult substrates. Hydrophilic (anti-fog) properties can also be varied to suit the end product's intended use. Solvent-free, liquid compositions that can be used as coatings or in the casting of molded elements, are also within the scope of the invention. The desired properties of the coatings are discussed in more detail below.

The polymeric composition exhibits excellent surface hardness and water repellent properties without the need for chain extenders or surfactant materials to provide the desired balance of physical and non-fogging properties. Although most of the mixtures do not employ surfactants or chain extenders, surfactants and chain extenders may be used in some instances. Accordingly, many of the coatings described herein are "substantially free" of chain extenders or surfactant materials. In this instance, "substantially free" means having less than about 3%, more particularly less than about 1%, and more typically, 0.5% to 0% of chain extender or surfactant. The hydrophobic nature of the surface reduces the presence of water deposited on the surface. Any water that is deposited thereon may be at least partially absorbed through the porous surface layers and absorbed into the coating's hydrophilic interior. This combination of hydrophilic and hydrophobic properties provides a very effective non-fogging and scratch resistant surface.

The composition system typically comprises an isocyanate prepolymer with reactive isocyanate groups or a blocked isocyanate, and a water-soluble or water dispersible polyol. The system may further comprise, although it need not, appropriate organic solvents or water, emulsifiers, and coalescent, catalysts, surfactants, and paint additives (typically at levels below 1% by weight). The reaction of the isocyanate and the polyol forms a part hydrophilic and part hydrophobic polyurethane composition when reacted and cured under particular conditions. By varying the type of isocyanate, the type and molecular weight of the polyol, the percent solids of the material and the catalyst, the hardness, fog resistance, efficacy, and other physical and chemical properties can be varied.

More specifically, the coating may be the product of the reaction, usually under heat, of an isocyanate prepolymer and a polyalkylene glycol. Isocyanate adducts and prepolymers particularly effective in the invention include blocked and unblocked cyclic or aliphatic diisocyanates. Polyalkylene glycol polymers that may be used include diols, multi-functional variants such as tri- and tetrahydroxy glycols, branched ethylene oxide/propylene glycol copolymers and block polymers of the above. Catalysts may include the common organometallic materials normally used to produce polyurethane substances. Specifically, dibutyl tin dilaurate may be used as an acceptable catalyst. Other additions include solvents, and rheological additives. The inclusion of catalytic substances is pendent on the choice of polymeric functionality and the intended cure schedule. Thus, some materials function well without the usual polyurethane initiators. These materials are described in more detail below.

Isocyanates

Typically, the isocyanate prepolymers used to prepare the coatings contain 2 or 3 isocyanate groups, although more groups are certainly acceptable. Examples of isocyanate systems include a biuret or an isocyanurate of a diisocyanate, triisocyanate or polyisocyanate. The following are typical diisocyanates prepolymers that may be used: hexamethylene diisocyanate, diisophorone diisocyanate, and toluene diisocyanate. Blocked isocyanates may also be used in order to address ingredient limitations and stability problems.

Mixtures having the blocked polyisocyanates may be applied using any of the application techniques discussed herein. Typically, mixtures having the blocked polyisocyanates are cured or heated after having been applied to a plastic or glass substrate. During heating, the blocked polyisocyanates dissociate so that the isocyanate groups become available to react with the active groups of the polyols (discussed in more detail below), thereby leading to substantial crosslinking and hardening of the coating. Blocked isocyanates are isocyanates in which at least one isocyanate group has reacted with a protecting or blocking agent to form a derivative which will dissociate on heating to remove the protecting or blocking agent and release the reactive isocyanate group.

Examples of blocking agents for polyisocyanates include aliphatic, cyclo-aliphatic or aralkyl monohydric alcohols, hydroxylamines and ketoximes. Other examples of applicable blocking agent functionalities include the following: oximes (compounds containing the radical —CH(:N.OH)), pyrazoles, phenols and caprolactams. Typical pyrazoles are 4 membered rings having the following formula:

Blocked isocyanates and combinations of the above also produce effective formulations.

Most of these blocked polyisocyanates tend to dissociate at temperatures of about 90° C. to about 180° C. (160° C.). Other blocked polyisocyanates, however, may dissociate at lower temperatures, especially when used in the company of a catalyst. For example, the temperature to which the coated article must be heated may generally fall to about 100 to 140° C. when using the polyisocyanates discussed below. The presence of a catalyst may increase the rate of reaction between the liberated polyisocyanate and the active hydroxyl group of the polyol. Examples of blocked polyisocyanates having a lower dissociation temperature include compounds having the following formulas:

FORMULA A wherein R is a cycloaliphatic, heterocyclic, m valent aliphatic, or aromatic residue and each Y, which may be the same or different, is

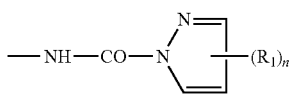

Where $R_1$ is, or, when n is more than 1, each $R_1$, which may be the same or different, is an alkyl, alkenyl, aralkyl, N-substituted carbamyl, phenyl, $NO_2$, halogen or

group where $R_2$ is a $C_1$-$C_4$ alkyl group,
n is 0, 1, 2, or 3
and m is an integer >1, preferably 2-6.

When $R_1$ represents an alkyl or alkenyl group it may contain up to 4 carbon atoms. $R_1$ may also be an aralkyl group, wherein the aryl portion may be phenyl and that the alkyl portion may contain 1 to 4 carbon atoms. When $R_1$ is a halogen, it may typically be chlorine or bromine.

The blocked polyisocyanate of the formula A is formed by admixing the polyisocyanate $R(NCO)_m$ with a sufficient quantity of a pyrazole of the formula:

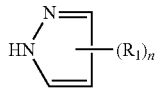

such that the reaction product contains substantially no free isocyanate groups and is a urea of formula I. This reaction is exothermic and since the reaction product will dissociate if the temperature is raised sufficiently, cooling may be required to keep the temperature of the reaction mixture down, preferably to 80° C. or less.

Other blocking agents used in the present invention may be pyrazoles of the formula:

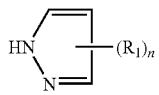

where $R_1$ and n are as defined above. Examples of the pyrazoles include, but are not limited to, 3,5-dimethylpyrazole, 3-methylpyrazole, 4-nitro-3,5-dimethylpyrazole and 4-bromo-3,5-dimethylpyrazole.

Some of these pyrazoles can be made by converting acetylacetone (AA) into a derivative that will react with hydrazine to give the desired pyrazole as shown below:

AA+$N_a$+$CH_2$=CH $CH_2$Cl→$Ac_2$CH$CH_2$CH=$CH_2$

AA+$N_a$+PhCH$_2$Cl→$Ac_2$CHCH$_2$Ph

AA+PhNCO→$Ac_2$CHCONHPh

The polyisocyanate which is to be blocked may be any organic polyisocyanate suitable for crosslinking compounds containing active hydrogen, e.g., those listed above as well as aliphatics including cycloaliphatic, aromatic, heterocyclic, and mixed aliphatic aromatic polyisocyanates containing 2, 3 or more isocyanate groups. The group R will normally be a hydrocarbon group but substitution, e.g., by alkoxy groups is possible.

Other blocked isocyanates may include, but should not be limited to, hexamethylene diisocyanate, toluene diisocyanate, diphenylmethane diisocyanate, bis(methylcyclohexyl) diisocyanate, oxime blocked hexamethylene diisocyanate, diethyl malonate blocked toluene diisocyanate. The isocyanate may also be a biurate, e.g., defined as the partial reaction of a polyisocyanate with hydroxyl or amine components to increase terminal isocyanate groups. All isocyanates listed as Desmodur tradenames may be used, including, Desmodur 75, which is a hexamethylene diisocyanate. The following blocked isocyanates, available from Baxenden (Lancashire, England), may also be used: ε-caprolactam blocked toluene diisocyanate (trixene 7673 & 7773), 3,5-dimethylpyrazole blocked toluene diisocyanate (trixene 7683), 3,5-dimethylpyrazole blocked isophorone diisocyanate (trixene 7950), 3,5-dimethylpyrazole blocked isophorone diisocyanate trimer (trixene 7951), 3,5-dimethylpyrazole blocked hexamethylene diisocyanate biuret (trixene 7960 & 7961), diethyl malonate blocked hexamethylene diisocyanate biuret (trixene 7962 & 7963), ε-caprolactam blocked hexamethylene diisocyanate trimer (trixene 7981), 3,5-dimethylpyrazole blocked hexamethylene diisocyanate trimer (trixene 7982 & 7986), methylethylketoxime blocked hexamethylene diisocyanate trimer (trixene 7984), 3,5-dimethylpyrazole and diethyl malonate blocked isophorone diisocyanate trimer (trixene 7990), 3,5-dimethylpyrazole and diethyl malonate blocked hexamethylene diisocyanate biuret (trixene 7991), and 3,5-dimethylpyrazole and diethyl malonate blocked hexamethylene diisocyanate trimer (trixene 7992). Diisocyanates, e.g. toluene diisocyanates and hexamethylene diisocyanates, blocked with the following blocking agents may be used: 3,5-dimethylpyrazole, diethyl malonate, ε-caprolactam, and methylethylketoxime.

Other isocyanate compounds may be, for example, ethylene diisocyanate, propylene diisocyanate, tetramethylene diisocyanate, decamethylene diisocyanate, dodecamethylene diisocyanate, 2,4,4-trimethylhexamethylene-1,6 diisocyanate, phenylene diisocyanate, tolylene or naphthylene diisocyanate, 4,4'-methylene-bis(phenyl isocyanate), 4,4'-ethylene-bis(phenyl isocyanate), ω,ω'-diisocyanato-1,3-dimethyl benzene, ω,ω'-diisocyanato-1,3-dimethylcyclohexane, 1-methyl-2,4-diisocyanato cyclohexane, 4,4'-methylene-bis (cyclohexyl isocyanate), 3-isocyanato-methyl-3,5,5-trimethyl cyclohexyl isocyanate, dimer acid-diisocyanate, ω,ω'-diisocyanato-diethyl benzene, w, ω'-diisocyanatodimethyl cyclohexyl benzene, ω, ω'-diisocyanatodimethyl toluene, ω, ω'-diisocyanato-diethyl toluene, fumaric acid-bis(2-isocyanato ethyl) ester or triphenyl-methane-triisocyanate, 1,4-bis-(2-isocyanato prop-2yl) benzene, 1,3-bis-(2-isocyanato prop-2yl) benzene.

These isocyanates are commercially available from manufacturers and distributors such as DuPont, Dow, Cytec, PPG, Crompton, Bayer, and Baxenden. Typically, the isocyanates that are used have low molecular weights, e.g., hexamethylene diisocyanate and toluene diisocyanate, in order to maximize the available anti-fog effect.

Use can also be made of polyisocyanates obtained by reaction of an excess amount of the isocyanate with a) water, b) a lower molecular weight polyol (e.g. m.w.<300) or c) a medium molecular weight polyol, e.g. a polyol of greater than 300 and less than 8000 m.w., e.g. sucrose, or by the reaction of the isocyanate with itself to give an isocyanurate.

The lower molecular weight polyol comprises, for example, ethylene glycol, propylene glycol, 1,3-butylene glycol, neopentyl glycol, 2,2,4-trimethyl-1,3-pentane diol, hexamethylene glycol, cyclohexane dimethanol, hydrogenated bisphenol-A, trimethylol propane, trimethylol ethane, 1,2,6-hexane triol, glycerine, sorbitol or pentaerythritol, and combinations thereof.

Polyols

Typical polyols used in conjunction with the invention have a molecular weight of at least about 90, and more particularly at least about 600, and most typically at least about 800. The molecular weight of the polyols will generally be less than about 30,000, more particularly less than about 12,000, even more particularly less than about 4000, and typically below 1500. The polyols used in conjunction with the invention may be straight, branched, or cyclic.

Examples of some of the many possible polyols include polyalkylene glycols such as polyethylene glycols (PEGs), and polypropylene glycols (PPGs). A general formula for polyalkylene glycols follows: $H(OR)_nOH$, wherein R is an alkyl group and n>10. A general formula for polyethylene glycols is $H(OCH_2CH_2)_nOH$, wherein n is >2. A general formula for polypropylene glycol is $H(OCH_2CH_2CH_2)_nOH$, wherein n is >2. Typically, the polyols are water soluble or dispersible. Block polymers of polyalkylene glycols, and more particularly, block polymers of polyethylene glycol and polypropylene glycols may be used. Even more particularly, polyethylene-90 or polyethylene-180 may commonly be used. Polyoxyethylene glycols can also be employed.

While a very wide variety of polyols may be used, the typical system will employ at least one of polyalkylene glycols, water soluble triols, tetrahydroxy-functional branched ethylene oxide/propylene glycol copolymers, block polymers thereof, and combinations thereof. Other variations include water soluble triols or glycerin polymers and other multifunctional, branched polyhydroxyl compounds such as tetrahydroxy functional copolymer of ethylene oxide and propylene glycol, and/or block polymer combinations of any of the above. Tetrahydroxy functional-branched/ethylene oxide/propylene glycol co-polymers may also be used. Commercial examples of ethylene oxide/propylene oxide copolymerisates include P41/200 (m.w. about 3,500), P41/300 (m.w. about 5,000), P41/3000 (m.w. about 15,000) and P41/12000 (m.w. about 20,000) obtained from Clariant (Germany).

Catalysts

Catalysts may or may not be employed in conjunction with the mixtures and coatings of the present invention. When used, a wide variety of catalysts that are known in the art may be employed. For example, catalysts such as dibutyl tin dilaurate or triethylene diamine may be used. In addition, other catalysts that may be used include, but are not limited to, the following: amines such as tetramethylbutanediamine; azines such as 1,4 diaza(2,2,2)bicyclooctane; and other organotin compounds such as tinoctoate. These catalysts may facilitate the reaction and may be used to complete the cure of the mixture. More particularly, catalysts may be effective, during heating, to facilitate the dissociation of the blocked polyisocyanates so that the isocyanate groups become available to react with the active groups of the polyols, thereby leading to substantial crosslinking and hardening of the coating.

Solvents

The mixtures of the present invention may or may not comprise at least one solvent. A wide variety of solvents may be used and will be understood by those of ordinary skill in the art. For example, tertiary butyl alcohol, as shown below, may be used:

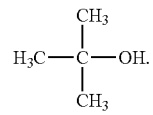

Other solvents that may be used include diacetone alcohol, primary and secondary alcohol. A non-polar solvent that may be used is xylene, although polar solvents tend to work better.

In the case of coatings using reactive isocyanates, non-reactive solvents such as tertiary butyl alcohol, diacetone alcohol, isophorone, glycol ether EB (2-butoxy ethanol), and the like are used. In these systems, the greater part of the solvent mixture is composed of polar solvents without primary or secondary alcohols. Smaller amounts of aliphatics, aromatics and other non-polar solvents may then make up the remainder, if so desired.

The systems can be prepared solvent free. This form of the invention may be used to produce film, cast/molded objects, and co-extruded materials. Using methods well known to the industry, the production of thin films, solids sheets, and monolithic shapes, (i.e., lenses, 3-dimensional objects, etc.) is thus possible.

In systems using blocked isocyanates, most solvents are applicable. Any of various solvents including alcohols, ketones, aromatics, and aliphatics may be used depending upon the specific substrate and/or application and curing environments.

Rheological Agents

The mixtures and coatings of the present invention may also comprise rheological additives. Rheological agents may be added to increase film thickness without increasing solids, to stabilize the coatings, control slip, flow and/or leveling difficulties. Examples of rheological agents include, but are not limited to, ethyl cellulose, methyl cellulose, sodium dioctyl sulfonic acid, associative PUR thickeners, anti-mar agents, and combinations thereof. Examples may include DC 28 distributed by Dow Corning, or SILWET® L-7602 and SILWET® L-7608 obtained from Crompton of Pittsburgh, Pa., some of which are polyether silicone flow/level agents. Additional commercial examples include SILWET® L-77, SILWET® L-720, SILWET® L-722, SILWET® L-7001, SILWET® L-7002, SILWET® L-7087, SILWET® L-7200, SILWET® L-7210, SILWET® L-7220, SILWET® L-7230, SILWET® L-7500, SILWET® L-7600, SILWET® L-7604, SILWET® L-7605, SILWET® L-7607, SILWET® L-7622, and SILWET® L-7657.

The Mixture

Typically, the mixtures of the present invention comprise the following:

| | |
|---|---|
| Polyol | About 10.0% to about 85.0% by weight; |
| Isocyanate | About 15.0% to about 90.0% by weight; |
| Catalyst | About 0.0% to about 2.0% by weight; |
| Solvent | About 0.0% to about 95.0% by weight; and |
| Rheological Agent | About 0.0% to about 2.0% by weight. |

The amount of polyol in the mixture is generally greater than about 10% by weight, typically greater than about 30% by weight, and more particularly greater than about 40% by weight. The amount of polyol is usually less than about 85% by weight, typically less than about 65% by weight, and more particularly less than about 55% by weight. The amount of isocyanate in the mixture is generally greater than about 15% by weight, typically greater than about 35% by weight, and more particularly greater than about 45% by weight. The amount of isocyanate is usually less than about 90% by weight, typically less than about 70% by weight, and more particularly less than about 60% by weight.

These components are weighed out using techniques that are generally known in the art. Some or all of the components are then mixed using simple mixing, admixing, homogenization, or a combination thereof in order to form the mixture. This initial mixing is typically performed at ambient conditions, namely, ambient temperatures and pressures. Each of these mixing techniques is well-known in the art.

The mixtures may then be applied to a variety of substrates using a variety of techniques that are well-known in the art. For example, the mixtures discussed herein may be applied directly or indirectly to glass and plastic. In other words, one or more substrates, coatings, layers, or other substances may exist between the mixture (and subsequently, the coating) and the glass or plastic substrate. As used herein, "applying a mixture to a substrate," "a substrate having a coating" thereon or a "substrate having a coating or at least a portion thereof" may mean that one or more substrates, coatings, layers or other substances exist therebetween unless otherwise specified. For example, the mixtures or coatings described herein may be applied to a plastic film (e.g. an acrylic adhesive), wherein the plastic film bonds to the glass or plastic substrate. In a further example, a primer, comprising for example epoxy silane dissolved in alcohol, may be applied to the glass substrate by a flow coat or a curtain coat technique prior to application of the mixture by one of the same techniques. Curtain coating is well known in the art. In addition the mixtures or coatings might be applied to a low-E plastic film or a substrate. Regarding glass, the hardness, tintability, water repellency, and hydrophilicity are properties to consider when choosing the glass. On plastics, the properties to consider are hardness, tintability using hot dye at 90° C., water repellency, hydrophilicity, flexibility, thermoformability using heat and/or pressure, and adhesion. Examples of possible plastic substrates include, but are not limited to, polycarbonate, allyl diglycol carbonates or copolymers thereof, acrylic, acrylics, urethanes, polysulfone, polyarylate, PETG, PET, polyolefins, and combinations thereof. The selection of the base components may be as important. For example, the selection of an aliphatic polyurethane base contributes to good resistance to adverse weather conditions and solar aging/ultraviolet rays. Again, using the low-E surfaces and coatings discussed above produces superior results.

The mixtures may be applied to these substrates using a variety of techniques that are well-known in the art. For example, the mixtures may be sprayed onto the substrate using high pressure spray applications. Additionally, the substrate may be dipped into the mixture. Flow, spin, curtain, and blade techniques may also be used, all of which are well-known in the art.

Subsequently, after the mixture is applied to the substrate, the mixture is exposed to ambient conditions. Typically, the exposure will be for greater than about one minute, and more particularly greater than about 10 minutes. The exposure to ambient conditions after application is generally less than about 60 minutes, and more particularly less than about 40 minutes. The mixtures are generally exposed to ambient conditions in order to let any solvents in the mixture evaporate.

The mixture is then cured. Typically, the mixture is at least briefly cured at a temperature that is greater than 80° C., more particularly greater than 100° C., and even more particularly greater than 125° C. Curing is usually performed at temperatures that are less than about 180° C., more particularly less than about 135° C., and even more particularly less than about 125° C. Curing times may vary. Typically, the mixture is cured for at least about 10 minutes, more particularly at least about 20 minutes, and even more particularly at least about 40 minutes. Curing times are generally less than about 60 minutes, and more particularly less than about 40 minutes. Overall, the curing temperature and time will depend on the substrate's melting point, as well as the types and molecular weights of the isocyanate, polyol, blocking agent being used. The intended use of the part may also dictate the curing time and temperature. Again, when using a blocked isocyanate, the curing time and temperature must be sufficient to enable the blocker to dissociate, thereby allowing the isocyanate group to react with the hydroxyl groups and cross-link. Generally, the mixtures that are applied to the substrates are the result of at least one of the pre-polymers isocyanates at least partially reacting with at least one of the polyols. The resultant mixture, accordingly, typically comprises a cross-linked polyurethane.

Alteration of the amount of the individual components, i.e. ratios of solvent, polyols, isocyanates, etc. results in products having variable functional properties. The coatings and compositions of the present invention may possess a variety of chemical and physical properties and functionalities.

The resulting cured coating is part hydrophilic and part hydrophobic. More particularly, the surface is substantially hydrophobic, while the interior is substantially hydrophilic. By combining a porous, hydrophobic surface with a hydrophilic base polymer, it is possible to obtain a composition possessing excellent anti-fog characteristics and surface hardness. The absorbent polymer coating of the invention possesses a water-repellant surface due to the unique material combinations set forth in the application. This hydrophobic surface may be achieved, while maintaining a hydrophilic core layer, by substantially excluding surfactants and using higher molecular weight polyols as discussed herein. Increasing the molecular weight of the polyols tends to produce increasingly more non-polar polyurethanes after reaction with the isocyanates discussed above. These higher molecular weight polyurethanes contribute to the water-repellancy of the coatings.

In terms of hydrophobicity, water may run off part of the coating when applied to a substrate. Part of the water is actually repelled. The surfaces of these particular coatings generally do not tend to sheet and generally do not tend to be wet by water. This is due to the surface tension of the coating, which substantiates the water-repellancy or hydrophobicity of the coatings. Typically, the surface tension of the surface of the coatings will be greater than about 15 dynes/cm, more particularly, greater than about 20 dynes/cm, and even more particularly, greater than about 25 dynes/cm. The surface tension is typically less than about 60 dynes/cm, although the surface tension may be less than about 50 dynes/cm, or even less than about 45 dynes/cm. The surface tension of the coatings was tested according to the Wilhelmy Plate Method, which is well-known or readily ascertainable by those having ordinary skill in the art.

Cured coatings of the present invention that are products of the reaction of polyols having molecular weights of less than about 600 (see Example 1 below) may tend to have a surface tension of about 56 to about 61 dynes/cm. Polyurethanes made from polyols having molecular weights of about 600-800 (see Example 6), about 800-1500 (see Example 4), about 1500-4600 (see Example 3), and even about 12,000 tend to have surface tensions of about 50-57 dynes/cm, about 27-38 dynes/cm, about 23-25 dynes/cm and about 21 dynes/cm, respectively. The lower the measurement in terms of dynes/ cm, the more hydrophobic the surface. In other words, the low surface tension means that water is actually repelled (i.e. it beads off), rather than being sheeted or absorbed. Accordingly, by using polyols having higher molecular weights, the resulting polyurethanes exhibit more hydrophobic tendencies, at least at the surface.

As discussed above, however, the coatings described herein also have a hydrophilic interior portion. Hydrophilicity may be measured according to weight gain the coatings experience upon aqueous immersion. More specifically, "hydrophilicity" is a measure of the percent weight gain experienced by a coating that has been fully immersed in an aqueous medium for 96 hours at about 20 to 25° C. In other words, during this period, the coating will tend to attract a certain amount of water. The difference between the weight of the coating after being immersed and the weight of the coating before immersion, as expressed as a percent weight gain (as compared to the weight of the non-immersed coating) measures the hydrophilicity of the coating. In other words, the difference between the mass of the soaked coating and the dry coating measures the hydrophilicity of the coatings. Typically, the coatings described herein tend to gain greater than about 20% weight, more particularly greater than about 30% weight, and often times greater than about 35% weight. Weight gain is generally less than about 150%, and typically the weight gain is less than about 140%, and more particularly less than about 110%.

As shown in more detail below in the Examples, polyurethanes made from polyols having a molecular weight around 400 (see Example 1) may experience a weight gain of about 140% when exposed to the conditions discussed above. Polyurethanes made from polyols having molecular weights of about 800-1500 (see Example 2) experience a weight gain of somewhere between about 75 and about 105%, while polyurethanes made from polyols having molecular weights of about 4600 may exhibit a weight gain of around 35%. Typically, the higher the molecular weight of the polyol being used to form the coating, the less hydrophilic the hydrophilic portion of the coating will be. For the most part, general interpolation may be used to roughly determine the hydrophilicity of coatings discussed herein based on these numbers. The coatings set forth in Examples 23-43 tend to be hydrophobic.

In addition, the coatings possess excellent anti-fogging characteristics after being cured. Accordingly, the coatings are suitable for a variety of applications including, but not limited to, eyewear, optics, automotive and residential glass surfaces, and flat, sheet stock. Again, the cured anti-fog coatings have the ability to both repel and absorb water, rather than just sheet water. More particularly, many of the coatings of the present invention have the ability to pass EN-166, EN-168, and ENE-2205 (analogous to the ASTM D 4060 abrasion test described herein) tests, each of which is a standardized test, the specifications for which can be obtained from the European Union. More particularly, the coatings described herein may be able to pass the EN-166 test for over a minute, and often times for over five minutes.

Glass or plastic (that is usually transparent) coated with the coatings described herein tends not to fog when first exposed to a "cool environment," in which the temperature is between about 10° C. to about −25° C., for greater than about thirty seconds and then subsequently exposed to humid ambient conditions. At these temperatures, the relative humidity, of course, will be very low. Even after being exposed to the cool environment as set forth above for more than one minute, many of the glass or plastic substrates will not fog regardless of the amount of time they are exposed to ambient conditions. In more detail, the substrates will not fog after being exposed to the cool environment for a minute or more, and then being exposed to ambient conditions for ten seconds, thirty seconds, and even three minutes or more of exposure. Again, many of the coated substrates will not fog after humid ambient exposure for more than five minutes, more than ten minutes, and even indefinitely after being removed from the cool environment, after having been there for a minute or longer.

More particularly, in one set of experiments, transparent glass and plastic substrates coated with the coatings set forth herein were exposed to a variety of temperatures falling with the cool environment for about one minute, and then were exposed to ambient conditions. Many of the substrates did not fog after being exposed to the ambient conditions for 10 seconds, thirty seconds, and even three minutes and longer. Many of the coatings never fogged at all under these conditions. In another set of experiments, different coated transparent glass and plastic substrates were exposed to different temperatures within the cool environment for about five minutes and longer. The substrates were then removed and exposed to different ambient conditions. The substrates did not fog after 10 seconds. Many of the substrates did not fog after thirty seconds, after three minutes, after five minutes, after ten minutes and longer. Again, many of the substrates never fogged.

In addition, portions of substrates that are coated with the anti-fog coatings may not substantially fog when the coated portion has an initial surface temperature and is then exposed to a moist air ambient with a dewpoint temperature equal to or greater than the surface temperature for a period of time. More particularly, the substrates may not fog when the initial surface temperature is less than one or more of the following: 20° C., 10° C., 5° C., 0° C., −5° C., −10° C., −15° C., −18° C., −20° C. and −25° C. The period of time of exposure to the dewpoint temperature equal to or greater than the surface temperature may be greater than one or more of the following: 0 seconds, about 1 second, about 3 seconds, about 5 seconds, about 6 seconds, about 10 seconds, about 30 seconds, about 1 minute, about 2 minutes, about 15 minutes, about 30 minutes and about 1 hour. In other words, when coated substrates are first exposed to any of the temperatures or below the temperatures set forth above, and then exposed to a dewpoint temperature equal to or greater than the surface temperature for any of the periods of time set forth above, the substrate may not substantially fog. Not every coating described herein will prevent fog at each and every one of these parameters, although some of the coatings will. The dewpoint temperature that is equal to or greater than the surface temperature may encompass ambient conditions.

Typically, ambient conditions include any temperature or humidity that falls with the ambient temperatures and humidities discussed below. Ambient temperatures include temperatures that are typically greater than 10° C., and generally greater than 15° C. Ambient temperatures are usually less than about 60° C., typically less than about 55° C., and more particularly less than about 50° C. Ambient relative humidities mean some moisture was present in the air. The relative humidities are generally greater than about 20%, typically greater than about 30%, and more typically greater than about 35%. The relative humidity is typically less than about 100%, more typically less than about 95%, and more particularly, less than about 90%. Most typical of the ambient conditions is about 18° C. to about 30° C. and a relative humidity about 40 to about 70%. As used herein, "moist ambient conditions" and "moist air ambient" are meant to refer to temperatures and relative humidities, falling within the ranges of this paragraph, that are most typically associated with the humid ambient conditions in a grocery store, convenience store, or supermarket, or the conditions immediately adjacent a beverage cooler. Moisture is typically present in these conditions. Substrates first exposed to the cool environment may not fog when exposed to some or all of the ambient conditions.

Curing the mixtures also results in coatings that have excellent hardness characteristics as demonstrated by testing as specified by ASTM D 4060. More particularly, the coatings tend to have a taber haze of less than about 10% at 100 cycles with 500 gram load and a CS-10F load, and more specifically less than about 5%. Some of the coatings described herein may have a taber haze of less than about 3% or even about 1%. Typically, known anti-fog coatings exhibit a taber haze of greater than 15%. Most polysiloxane hardcoats typically exhibit a taber haze of 3 or greater.

When testing the coatings according to ASTM 3363 described in more detail below, the coatings tend to exhibit a hardness of greater than about 2H, and typically greater than about 4H. Generally, the hardness is less than about 8H, and less than about 6H. In this test, the pencil's lower 10-15 mm is trimmed of wood, leaving only the central lead core extending out of the body of the pencil. Then the lead is held perpendicular to a flat surface upon which a piece of fine sandpaper is mounted. The protruding section of lead then is abraded at 90°, so as to render the tip of the lead perfectly flat and perpendicular to the pencil's length. The hardness test is performed by applying a pencil hardness tester consisting of a rolling tester weighing 200 g and fixing the pencil at a 45° angle through the body of the tester and extending onto the test surface below. The device is moved across the sample (laid flat, horizontally on a hard, level surface) for a distance of about 24 mm. As it moves, the pencil's lead (at a 45° angle) will incise/etch a scratch/line into the sample surface if the pencil's graphite/hardness rating is harder than the sample's coated surface. Hardness is rated as the hardest lead that does not leave a visible score.

The coatings of the present invention may also have excellent adhesion properties as indicated by the coatings' ability to pass the ASTM B 3359 Method B discussed herein. For example, many of the coatings can withstand at least one, three and even five pulls with standard Scotch tape 3M 160 on 100 square hatch with no pull up. Moreover, some of the coatings can even withstand boiling water exposure, and pass 120 minute adhesion tests.

The coatings also tend to be substantially clear. This property makes the coatings ideal for substrates that are transparent. In other words, the coatings do not blur or obstruct vision through transparent substrates. When applied to transparent substrates, the coatings may exhibit less than 0.5% detectable haze by hazemeter, more particularly less than 0.3% detectable haze by hazemeter, and even more particularly less than 0.2% detectable haze by hazemeter.

The coatings of the present invention may also have excellent color stable properties as indicated by a no-fog coating color stability accelerated test. One issue with other coatings is their propensity to discolor, e.g., turn yellow, over time when exposed to fluorescent light. The color stability accelerated test provides a way to benchmark the performance of the color stability of a coating at accelerated conditions. The test measures the CIELAB $L^*$, $a^*$ and $b^*$ values of different no-fog coated glass lites over different a periods of time (e.g. about 30 days under about 0.05 mw/cm² radiant intensity. CIELAB is one of several International Commission on Illumination (CIE) color spaces that defines the range of colors visible to the human eye, and should be readily known to those of skill in the art. The coordinate $L^*$ stands for lightness, $a^*$ represents where the color is on the redness-greeness axis and $b^*$ stands for the color's position on the yellowness-blueness axis. The subject matter found in http://www.specialchem4coatings.com/tc/color/index.aspx?id=cielab is hereby fully incorporated by reference. A color is defined as pure white when $L^*=100$, $a^*=0$ and $b^*=0$. A color is defined as absolute black when $L^*=0$, $a^*=0$ and $b^*=0$. The CIELAB values of color stable coatings should remain relatively constant over long periods of time. Some of the coatings in the present invention showed excellent color stability when exposed to fluorescent light for extended periods of time. Particularly, the coatings may show a change in $L^*$ of less than about 10.0, a change in $a^*$ of less than about 1.2, and a change in $b^*$ of less than about 6.0, when the coating is exposed to fluorescent light having a radiant intensity of 0.05 mw/cm² over a period of greater than about 5 days. Again, using CIELAB values, $L^*$ measures the psychometric lightness of a coating. "Over the period greater than 5 days" means that the $L^*$, $a^*$ and $b^*$ values will only change as set forth above from a first reading to a second reading, wherein the initial reading and the second reading are 5 days apart.

Many of the coatings have the ability to have a $L^*$ change of less than 10.0, less than 5.0, less than 2.5, less than 1.25, less than 0.65, less than 0.1, and even less than 0.05 over periods greater than 5 days, 10 days, 15 days, 20 days, 25 days and even greater than 30 days. Some of the coatings may also have the ability to show an $a^*$ change of less than 1.2, less than 0.6, less than 0.3, and even less than 0.15 over periods greater than 5 days, 10 days, 15 days, 20 days, 25 days and even greater than 30 days. Again, the number of days is a measure of time between a first reading of the $a^*$ value and the second reading. Many of the coatings also have the ability to show a $b^*$ change of less than 0, less than 2.5, less than 6.0, less than 3.0, less than 1.5, less than 0.75, less than 0.5 and even less than 0.25 over periods greater than 5 days, 10 days, 15 days, 20 days, 25 days and even greater than 30 days. Again, each of these examples assumes that the coating is exposed to fluorescent light having a radiant intensity of 0.05 mw/cm² for the periods of time set forth above.

In one example, exposure of a coating, comprising 3,5-dimethylpyrazole blocked hexamethylene diisocyanate biuret, to fluorescent light for about 24 days caused changes in $L^*$ of about 0.06, changes in $a^*$ of about 0.10, and changes in $b^*$ of about 0.20.

The life of the coating, when applied to a substrate, is typically greater than about 2 years, but may be greater than about 5 years, and may even be longer than about 10 years. The shelf-life of the mixtures is also excellent. Compositions may be formulated into single- or dual-component (2K) forms. This allows the selection of unique reactive materials to suit the various needs of the end product. Typically, the shelf life of the mixtures is at least about 6 months, sometimes at least about 1 year, and at times at least about 2 years.

The coatings also exhibit exceptional thermoformability. More particularly, the coatings have been applied to substrates and then bent between two pieces of curve metal under high heat, more particularly, temperatures greater than about 150° C., and even greater than about 180° C. for about 1 to about 2 minutes. The coatings did not crack or lose adhesion properties during this test.

The coatings after being cured tend to have a thickness of at least about one-half micron, more particularly greater than about one micron, more particularly greater than about 3 microns, and typically greater than about 5 microns. The thicknesses also tend to be less than about 30 microns, more particularly less than about 20 microns, and typically less than about 15 microns.

Resulting urethanes also accept commercially-available color tints and functional solution treatments (i.e. non-fogging, uv-filtration, anti-static) utilized by the retail optical industry.

The present invention is further explained by the following examples that should not be construed by way of limiting the scope of the present invention.

EXAMPLES

Example 1

To illustrate the preparation of an abrasion resistant anti-fog coating with a hydrophilic surface. Part A was mixed using simple mixing, namely, a magnetic stir bar and plate with Part B. Part A comprised about 28.1 grams Desmodur N-75 (Bayer) well mixed with about 21.9 grams of diacetone alcohol. Part B comprised about 37.8 grams of diacetone well mixed with about 11.0 grams PEG-90, 0.2 grams dibutyltin dilaurate, and DC-57 additive (Dow Corning). The mixture was immediately applied to a 4" square of Lexan polycarbonate, via an airbrush. The mixture was then allowed to stand at ambient conditions for about 10 minutes. It was then baked for one hour at 125° C. The sample had excellent anti-fog properties when blown on. A 100-cycle taber abrasion test resulted in a haze of less than 5% using a dual, 500-gram load and a CS-10F abraser wheel. Note that the light transmittance of the coated sample exceeded the uncoated polycarbonate (approx. 92% before coating application). Separately, each part exhibited a shelf life of over 6 months with no loss of performance properties after mixing appropriately. The pot life of the prepared/mixed composition was about 24 to 36 hours. See Table I for summarized performance properties.

Example 2

Part A was mixed with Part B using simple stirring, namely, a magnetic stir bar and plate to form the mixture. Part A comprised 28.1 grams of Desmodur N-75 (Bayer) well mixed with 21.9 grams of diacetone alcohol. Part B comprised 35.8 grams of diacetone well mixed with 13.9 grams of polyethylene glycol-180, 0.2 grams of dibutyl tin dilaurate, and 0.05 grams of DC-57 manufactured by Dow Corning. The mixture was immediately applied by flow-coating to a 4" square of Teflon coated metal, and allowed to stand at ambient conditions for about 5-10 minutes. The cooled, cured film was peeled from the teflon surface and wrapped around a 0.5" steel rod to observe the flexibility of the film. No crazing or marring was observed even after wrapping the cured film around itself multiple times. The film shows excellent anti-fog properties when blown on or exposed to changes in humidity and temperatures. Condensed water vapor reduces clarity after a few minutes of exposure. The film fills light scratches produced by 6H pencil, and had exceptional flexibility. These coatings resist cracking when rolled into a circular shape. See Table I for summarized performance properties.

Example 3

Example 3 illustrates the preparation of a water-repellant, anti-fog coating for low-temperature usage. In a 1-L beaker equipped with a magnetic stirrer and a heating mantle, about 200 grams Baxenden 7683 obtained by Baxenden was stirred with about 281 grams of diacetone alcohol to produce a solution of blocked polyisocyante in solvent. The solution was then heated to 60° C. To the heated, stirring solution was added a solution of 179 g of PEG-4600 in about 179 grams of diacetone alcohol. The solution was stirred and maintained at 60° C. for about 10 minutes. Then 1.6 grams each of dibutylyln dilaurated, and DC-57 additive (Dow Corning) were stirred in to produce a coating composition. The heated mixture was then applied to glass panels via flowcoating, and allowed to hang vertically at ambient conditions for 5 minutes. Samples were then baked for about 25 minutes at 150° C. Subsequently, the cooled, cured samples were exposed to −25° C. for 10 minutes, and then exposed to ambient conditions (25° C., 70 to 75% relative humidity) for about 15 minutes. This was repeated 20 times. The coated glass was found to maintain clarity and did not collect excessive moisture on its coated surfaces. The surface tension was found to be about 23 dynes/sq cm compared to the untreated glass having a surface tension of about 76-78 dynes/sq cm (this quantifies the hydrophobic nature of the surface of the invention when prepared with higher molecular weight polyols). See Table I for summarized performance properties.

Example 4

To illustrate the preparation of a water repellant, anti-fog coating, about 396 grams Desmodur N-75 (Bayer) was stirred with about 193 grams of diacetone alcohol in a 1-L beaker equipped with a magnetic stirrer, in order to produce a solution of blocked polyisocyante in solvent. To the stirring solution was added a solution of about 147 grams of PEG-1500 in about 147 grams of diacetone alcohol. Subsequently, about 2.2 grams of dibutylyln dilaurate, about 0.5 grams of FC-4430 (3M of Minnesota)—flow/leveling aid, and about 1.0 grams of Silwet L-7602—slip/anti-mar agent (Crompton) were added, with stirring, to produce a low-viscosity coating composition. Commercial ADC (allyl diglycol carbonate, CR-39) panels, 4 inch by 4 inch, were etched, cleaned, and then dipped into the filtered coating solution using a 4.5 inch/minute withdrawal rate. Coated samples were then baked for 90 minutes at 105° C. The cured samples were found to perform very well. Surface tension measured after conditioning at about 20-22° C.; 70 to 75% relative humidity for about 24 hours: 27-29 dynes/sq cm. See Table I for summarized performance properties.

Example 5

To illustrate another preparation of a water-repellant, anti-fog coating, a solution of 115 grams of a DEM (diethyl malonate)-blocked hexamethylene diisocyante prepolymer containing 70% solids (Baxenden 7963), by weight in methoxypropanol (glycol ether PM) was added to 100 grams of 2-butoxethanol (glycol ether EB). To this stirring solution was added: 1.1 grams of DBTDL (dibutyl tin dilaurate), 10% in EB. Then, 38.5 grams of a monohydroxy, -monobutoxy-functional polypropelene polyglycol (B01/120 form Clariant Germany) and 20.0 grams of a polycaprolactone (CAPA 3091 from Solvay UK) were added. Finally, a solution of 0.8 grams of DC-57, and 1.5 g. of Silwet L-7608—leveling & air release aid in 150 grams of DA were added to complete the coating formulation. Polyamide lenses (trogamid brand) were cleaned, flow-coated with the solution at 20° C. and then suspended vertically for 15 minutes to allow solvents to partially evaporate. Coated samples were cured in a convention oven. After 120 minutes at about 109° C., the samples were removed and cooled. Anti-fog properties were excellent, and accelerated weathering (QUV test cabinet from Q-Panel Corp) tests indicated excellent resistance to UV and moisture. See Table I for summarized performance properties.

Example 6

To illustrate the production of a 3-dimensional shape (monolith) exhibiting permanent, intrinsic anti-fog properties. A mixture of about 5500 grams of caprolactam-blocked, 100% solids TDI prepolymer product (Baxenden BI 7773), about 1200 grams of PEG-800, and 2220 grams of a polyethylene glycol monomethyl ether having a molecular weight of 720-780 (M750 from Clariant) were stirred together at room temperature. To the well-mixed liquid was added about 5.4 g of DBTDL and about 0.5 g of tin diocctoate. The liquid molding composition was cast into a rectangular solid measuring 100 cm×100 cm×1 cm thick. The sample was cast between two glass plates that were sealed with a silicone elastomeric gasket, and cured at 165° C. for 2 hours. After cooling and removal from the mold, the solidified sample exhibited excellent optical properties and good hardness. Non-fogging properties were excellent on all surfaces. The lenses were also tinted and treated to block UV using a hot (90-92 C.) aqueous solution of Electron Beam Gray and UV-Shield (BPI of Miami Fla.). After 10 minutes of exposure, the lenses were rinsed and dried. Luminous transmittance of the gray lenses was less than 40%; UV transmittance was <2%. See Table I for summarized performance properties.

4-hydroxy-4-methyl-2-pentanone and 200 grams of 2-butoxy ethanol to produce a solution of blocked polyisocyante in solvent.

A 3-L dual-necked round-bottomed flask was equipped with a magnetic stirrer, reflux condenser, and a heating mantle. A mixture of 855 grams of powdered PEG-4600 and 200 grams of PEG-1000 was poured into the flask and 400 grams of tert-butanol was added. Heat was then applied, and the solution was brought to reflux for 10 minutes to dissolve the PEG solids. The solution was cooled to 60° C., and then added to the prepolymer solution, with stirring. 2.8 grams of dibutyltin dilaurate (DBTDL) was stirred in for 15 minutes, and then 0.4 g each of L-7602 and L-7608 was added.

The solution was maintained at 50-55° C. via the immersion heater and filtered through a 0.5 micron cartridge filter. Glass panels were sprayed with a 0.25% of an amino-functional silicone adhesion-promoter (Silquest A-1106) in a 50/50 aqueous solution ethanol. After drying for 5 minutes at 20° C., the primed glass was exposed to IR lamps for 15 minutes to cure the primed surface, and then allowed to cool to room temperature.

The filtered, hot coating solution was applied to the primed glass panels and allowed to hang vertically at ambient conditions for 25 minutes. Samples were cured for 45 minutes at 150° C. via a forced-air convection oven. After curing, the samples were cooled to room temperature. The surface tension was found to be about 29 dynes/sq. cm, and the samples possessed excellent surface hardness.

TABLE I

| ID | LT %[1] | Haze %[2] | Taber Test % Haze[3] | Adhesion %[4] | Pencil hardness[5] | Chemical Resistance[6] | Impact Resist[7] | Anti-fog[8] | Water Soak - AF[9] |
|---|---|---|---|---|---|---|---|---|---|
| 1 | >97.4 | <0.5% | 4.7 | 100 | 6H | Fail Acetone Pass Others | PASS | Pass 40 s | Fall 20 s |
| 2 | >99.1 | <0.1 | 3.9 | 100 | -na- | Pass all | -na- | -na- | -na- |
| 3 | >98.0 | <0.3 | 1.8 | 90/100* | 8H | Pass all | -na- | Pass 5 min | Pass 5 min |
| 4 | >96.8 | <0.2 | 2.2 | 100 | 4H | Fail Acetone Fail Xlene Pass others | PASS | Pass 3 min | Pass 2 min |
| 5 | >92.5 | <0.5 | 1.1 | 100 | 4H | Fail isopropanol** Pass others | PASS | Pass 2 min | Pass 2 min |
| 6 | >94.3 | <0.5 | 0.78 | -na- | 5H | Pass all | PASS | Pass Infinite | Pass Infinite |

*Example #3, when repeated using an air-dry primer prepared from 0.5% Sliquest A-1100 in isobutanol. The primer was stirred and sprayed onto the glass substrate. After 30 minutes of air-drying, the composition from Example #3 was applied and cured as before. Adhesion was excellent.
**Isopropanol exposure resulted in the appearance of visible haze - polyamide substrates are attacked by alcohols.
[1]ASTM (American Society for Testing and Materials) E 1348: Test Method for Transmittance by Spectrophotometry using Hemispherical Geometry
[2]ASTM E 284: Reflection Haze
[3]ASTM D 4060: Method of Abrasion Resistance of Organic Coatings - 100 cycles under a dual, 500 gram load using a standard Taber Apraser device [CS-10F Calibrase Abraser wheel]
[4]ASTM D 3359 Method B: Standard Test Methods of Measuring Adhesion by Tape Test
[5]ASTM D 3363: Test Method for Film Hardness
[6]ASTM D 1308: Test Method for Effects of Household Chemicals on Clear Organic Finishes. Chemicals include: isopropanol 70%, acetone, petroleum ether/hexane, xylene, ammonia, acetic acid, hydrochloric acid, Windex, cola/coffee/tea, sweat/saline, and water.
[7]ASTM D 2794: Test for Method of Resistance of Organic Coatings to the Effects of Rapid Deformation (Impact).
[8]EN 166 European Anti-Fog standard - continuous photometric measurement of luminous transmittance of sample exposed to fog-conducive environment. Measures point of loss of 20% of clarity.
[9]ASTM D 870: Practice for Testing Water Resistance of Coatings Using Water Immersion. Measure of Anti-fog performance (w/EN 166) after 96 hours of continual aqueous exposure followed by conditioning at 25° C./70-75% relative humidity for 24 hours before testing.

Example 7

Example 7 illustrates the preparation of another water-repellant, anti-fog coating for low-temperature usage. The prepolymer solution follows: In a 10-L polyethylene tank equipped with a gear-driven stirrer and an immersion heater, 1948 grams of caprolactam-blocked TDI prepolymer with an equivalent weight of 1395 was stirred with 400 grams of The prepared samples were exposed to −10° C. for 5 minutes, and then exposed to a humidity test cabinet maintained at 20° C. and 80% relative humidity. The coated glass was found to maintain clarity indefinitely, and did not collect excessive moisture on its coated surfaces, i.e., the surface did not fog. Samples were also saturated in deionized water via immersion for 96 hours. After removal from the water, samples were subjected to low-temperature testing as above. The samples collected excessive moisture on their surfaces after 5 minutes of humidity cabinet exposure but did not fog.

However, after allowing 30 minutes at 20° C. and 75% relative humidity for the saturated samples to equilibrate/dry out samples performed analogously to the initial test set. See Table II for summarized performance properties.

Example 8

Similar to Example 7, 2782 grams of a pyrazole-blocked toluene diisocyanate prepolymer with an equivalent weight of 560 was stirred with 400 grams of 4-hydroxy-4methyl-2-pentanone and 250 grams of 2-butoxy ethanol to produce a solution of blocked polyisocyante in solvent.

A 3-L dual-necked round-bottomed flask was equipped with a magnetic stirrer, reflux condenser, and a heating machine. Powdered PEG-4600, 1060 g, was poured in and 400 g of 4-hydroxy-4-methyl-2-pentanone was added. Heat was then applied, and the solution was brought to reflux for 2 minutes to dissolve the PEG solids. The solution was cooled to 60° C., and then added to the prepolymer solution, with stirring. DBTDL 175 g, was stirred in for 60 minutes, and then 0.4 g each of L-7602 & L-7608 was added.

The solution was maintained at 50-55° C. via the immersion heater and filtered through a 1.0 micron cartridge filter. Glass panels were sprayed with a 0.25% of an amino-functional silicone adhesion-promoter (Silquest A-1106) in a 50/50 aqueous solution ethanol. After drying for 5 minutes at 20° C., the primed glass was cured for 15 minutes in a thermal convection oven at 60° C., and then allowed to cool to room temperature. The filtered, hot coating solution was applied to the primed glass panels and allowed to hang vertically at ambient conditions for 15 minutes. Samples were cured for 30 minutes at 125° C. via a convection oven. Samples were cooled to room temperature.

The samples were then exposed to −20° C. for 10 minutes, and then exposed to a humidity test cabinet maintained at 20° C. and 78% relative humidity. The coated glass was found to maintain clarity indefinitely, and did not collect excessive moisture on its coated surfaces. Samples were also saturated in deionized water for 96 hours. After removal from the water, samples were subjected to low-temperature testing as above. The samples were clear after 5 minutes of humidity cabinet exposure and maintained clarity indefinitely. See Table II for summarized performance properties.

exhibited superior hardness. This Example shows the effect solvents have on the final surface hardness. See Table II for summarized performance properties.

Example 10

Example 10 was conducted as set forth above with respect to Example 9, except the mixture was applied with a spray appliance, which produces a much thinner coating—about 2-3 microns. The anti-fog results were similar to Example 7, however, the coating fogged only after saturation and repetition of low-temperature exposure to test chamber. It did not fog if allowed to equilibrate/dry out. See Table II for summarized performance properties.

Example 11

This Example was the same as Example 8, except it was sprayed. The results were essentially identical to Example 8. It was a more hydrophilic/anti-fog due to the reduced molecular weight of the polyol(s), despite thickness variance. See Table II for summarized performance properties.

Example 12

This Example was the same as Example 8, except that PEG-1000 in the same amount was substituted for the PEG of Example 8. In addition, 2-butoxyethanol was replaced with 200 g of isophorone, and 2 grams of DC-57 was added. The coating fogged in 25 seconds upon removal from low low-temperature (−12° C. for 5 minutes) and exposure to humidity cabinet. After saturation and soak, the substrate fogged immediately when brought from freezer to test chamber. This shows the effect of using a lower molecular weight polyol. See Table II for summarized performance properties.

Example 13

This Example was the same as Example 8, except Baxenden BI 7986 (an HDI biuret blocked with dimethylpyrazole) was substituted for the blocked isocyanate of Example 8. In addition, 1250 grams of PEG 4000 was substituted for the PEG of Example 8. This is an example of an alternated polyisocyante. See Table II for summarized performance properties.

TABLE II

| ID | LT %[1] | Haze %[2] | Taber Test % Haze[3] | Adhesion %[4] | Pencil hardness[5] | Chemical Resistance[6] | Anti-fog[8] | Water Soak - AF[9] |
|---|---|---|---|---|---|---|---|---|
| 7 | >97 | <0.5 | 6.9 | 100 | 6H | Pass all | Pass 5 min | Pass 3 min |
| 8 | >96 | <0.5 | 1.2 | 100 | 10H | Pass all | Pass 5 min | Pass 5 min |
| 9 | >99 | <0.5 | 2.1 | 100 | 8H | Pass all | Pass 5 min | Pass 3 min |
| 10 | >99 | <0.2 | 8.3 | 100 | 4H | Fail Acetone Fail Xlene Pass others | Pass 3 min | Pass 1 min |
| 11 | >97 | <0.5 | 6.0 | 100 | 6H | Fail Acetone Fail Xlene Pass others | Pass 3 min | Pass 2 min |
| 12 | >93 | <0.5 | 12.8 | 100 - tacky | 3H | Fail acetone Pass others | Pass 40 s | Fail |
| 13 | >93 | <0.3 | 5.5 | 100 | 6H | Pass all | Not available | Not available |

Example 9

Example 9 was conducted as set forth above with respect to Example 7, except that 2-butoxyethanol was replaced with diacetone alcohol (DAA), using the same amount. Example 9 exhibited similar properties to Example 7, except Example 9

Example 14

Part A was mixed with Part B using simple stirring, namely, a magnetic stir bar and plate to form the mixture. Part A comprised 51.45 grams of trixene 7683 (commercially available from Baxenden of Lancashire, England) well mixed with 20.67 grams of diacetone alcohol. Part B comprised 20.67 grams of diacetone alcohol well mixed with 27.79 grams of polyethylene glycol 4600 (i.e. PEG having a molecular weight of 4600), 0.053 grams of dibutyl tin dilaurate (obtained from Gelest of PA, USA) and 0.037 grams of DC-28 (obtained from Dow Corning). The mixture was immediately applied using flow-coating to a 4" square of Teflon coated metal, and allowed to stand at ambient conditions for about 10 minutes. The mixture was then baked for about 1 hour at about 125° C. to produce the coating.

Example 15

Part A was mixed with Part B using simple stirring, namely, a magnetic stir bar and plate to form the mixture. Part A comprised 51.45 grams of trixene 7683 (commercially available from Baxenden of Lancashire, England) well mixed with 20.68 grams of diacetone alcohol. Part B comprised 20.68 grams of diacetone alcohol well mixed with 27.79 grams of polyethylene glycol 4600, 0.053 grams of dibutyl tin dilaurate (obtained from Gelest of PA, USA), and 0.018 grams of L-7602 (obtained from Crompton of Pittsburgh, Pa., USA) and 0.018 grams of L-7608 (obtained from Crompton). These last two components are flow/leveling aids and slip-aids, respectively. The mixture was immediately applied using flow-coating to a 4" square of Teflon coated metal, and allowed to stand at ambient conditions for about 10 minutes. The mixture was then baked for about 1 hour at about 125° C. to produce the coating.

Example 16

Part A was mixed with Part B using simple stirring, namely, a magnetic stir bar and plate to form the mixture. Part A comprised 42.88 grams of trixene 7683 (commercially available from Baxenden of Lancashire, England) well mixed with 33.85 grams of diacetone alcohol. Part B comprised 33.85 grams of diacetone alcohol well mixed with 23.18 grams of polyethylene glycol 3000 (i.e. having a molecular weight of 3000), 0.053 grams of dibutyl tin dilaurate (obtained from Gelest of PA, USA) and 0.037 grams of DC-28 (obtained from Dow Corning). The mixture was immediately applied using flow-coating to a 4" square of Teflon coated metal, and allowed to stand at ambient conditions for about 10 minutes. The mixture was then baked for about 1 hour at about 125° C. to produce the coating.

Example 17

Part A was mixed with Part B using simple stirring, namely, a magnetic stir bar and plate to form the mixture. Part A comprised 42.67 grams of trixene 7683 (commercially available from Baxenden of Lancashire, England) well mixed with 33.75 grams of diacetone alcohol. Part B comprised 33.75 grams of diacetone alcohol well mixed with 23.49 grams of polyethylene glycol 3000, 0.053 grams of dibutyl tin dilaurate (obtained from Gelest of PA, USA) and 0.037 grams of DC-28 (obtained from Dow Corning). The mixture was immediately applied using flow-coating to a 4" square of Teflon coated metal, and allowed to stand at ambient conditions for about 0 minutes. The mixture was then baked for about 1 hour at about 125° C. to produce the coating.

Example 18

Part A was mixed with Part B using simple stirring, namely, a magnetic stir bar and plate to form the mixture. Part A comprised 42.88 grams of trixene 7683 (commercially available from Baxenden of Lancashire, England) well mixed with 33.91 grams of diacetone alcohol. Part B comprised 33.91 grams of diacetone alcohol well mixed with 11.56 grams of polyethylene glycol 3000, 0.053 grams of dibutyl tin dilaurate (obtained from Gelest of PA, USA) and 0.037 grams of DC-28 (obtained from Dow Corning). The mixture was immediately applied using flow-coating to a 4" square of Teflon coated metal, and allowed to stand at ambient conditions for about 10 minutes. The mixture was then baked for about 1 hour at about 125° C. to produce the coating.

Example 19

Part A was mixed with Part B using simple stirring, namely, a magnetic stir bar and plate to form the mixture. Part A comprised 42.88 grams of trixene 7683 (commercially available from Baxenden of Lancashire, England) well mixed with 33.91 grams of diacetone alcohol. Part B comprised 33.91 grams of diacetone well mixed with 11.56 grams of polyethylene glycol 12000 (i.e. molecular weight 12000), 11.56 grams of polyethylene glycol 1000, 0.053 grams of dibutyl tin dilaurate (obtained by Gelest of PA, USA) and 0.037 grams of DC-28 (obtained from Dow Corning). The mixture was immediately applied using flow coating to a 4" square of Teflon coated metal, and allowed to stand at ambient conditions for about 10 minutes. The mixture was then baked for about 1 hour at about 125° C. to produce the coating.

Example 20

Part A was mixed with Part B using simple stirring, namely, a magnetic stir bar and plate to form the mixture. Part A comprised 35.75 grams of trixene 7683 (commercially available from Baxenden of Lancashire, England) well mixed with 42.98 grams of diacetone alcohol. Part B comprised 42.98 grams of diacetone alcohol well mixed with 21.22 grams of polyethylene glycol 1000, 0.028 grams of dibutyl tin dilaurate (obtained by Gelest of PA, USA), 0.011 grams of L-7602 (obtained from Crompton of Pittsburgh, Pa., USA) and 0.011 grams of L-7608 (obtained from Crompton). The mixture was immediately applied using flow-coating to a 4" square of Teflon coated metal, and allowed to stand at ambient conditions for about 10 minutes. The mixture was then baked for about 1 hour at about 125° C. to produce the coating.

Example 21

Part A was mixed with Part B using simple stirring, namely, a magnetic stir bar and plate to form the mixture. Part A comprised 35.75 grams of trixene 7683 (commercially available from Baxenden of Lancashire, England) well mixed with 42.98 grams of diacetone alcohol. Part B comprised 42.98 grams of diacetone well mixed with 21.22 grams of polyethylene glycol 1500, 0.028 grams of dibutyl tin dilaurate (obtained by Gelest of PA, USA), and 0.011 grams of L-7602 (obtained from Crompton of Pittsburgh, Pa., USA) and 0.011 grams of L-7608 (obtained from Crompton). The mixture was immediately applied using flow-coating to a 4" square of Teflon coated metal, and allowed to stand at ambient conditions for about 10 minutes. The mixture was then baked for about 1 hour at about 125° C. to produce the coating.

Example 22

Anti-fog testing was performed on refrigerator doors having, among others, the coating set forth in Example 14. More particularly, testing was performed on refrigerators having a plurality of adjacent doors with the coatings thereon. Testing was conducted on both no-heat doors and heated doors. The test conditions for the no-heat doors follow: dry bulb temperature 75° F.; relative humidity 55%, discharge air temperature −12° F.; door surface temperature on the product side −3° F.; and door surface temperature on the customer side of 64° F. The test conditions for the heated door follow: dry bulb temperature 75° F.; relative humidity 55%, discharge air temperature −12° F.; door surface temperature on the product side 9° F.; and door surface temperature on the customer side of 74° F.

When the samples were tested, the coated surface was dry and had substantially no dust accumulation. Visible trans. was about 40 to about 50%. Anti-fogging properties were tested at certain time intervals. More particularly, the following time intervals were tested: 6 seconds, 15 seconds, 30 seconds, 1 minute, 2 minutes, 2 minutes and 30 seconds, 3 minutes, 4 minutes and 5-15 minutes. When coated doors having the surface temperatures set forth above were opened, and then exposed to the ambient conditions discussed above, substantially no fogging occurred at any of these time intervals. Similarly, the doors in the refrigerator adjacent the open door also did not fog during any of these time intervals. In other words, when one door was opened, allowing ambient air to flood the refrigerator, the closed doors adjacent the opened door exhibited substantially no fogging.

Example 23

An abrasion resistant, anti-fog coating with color stability was prepared by mixing trixene 7960 (65.4% by wt.), PEG-1000 (20.3% by wt.), diacetone alcohol (10% by wt.), sodium dioctyl sulfonic acid (3.2% by wt.), dibutyl tin dilaurate (0.57% by wt.), and an additional component (0.53% by wt. of the total mixture) comprising L-7602 (1.0% by wt.), L-7608 (1.0% by wt.) and diacetone alcohol (98.0% by wt.). The components were mixed under ambient conditions, using standard stirring techniques. This also applies to all of the following Examples.

Example 24

An abrasion resistant, anti-fog coating with color stability was prepared by mixing trixene 7960 (65.4% by wt.), PEG-400 (20.3% by wt.), diacetone alcohol (10% by wt.), sodium dioctyl sulfonic acid (3.2% by wt.), dibutyl tin dilaurate (0.57% by wt), and an additional component (0.53% by wt. of the total mixture) comprising L-7602 (1.0% by wt.), L-7608 (1.0% by wt.) and diacetone alcohol (98.0% by wt.).

Example 25

An abrasion resistant, anti-fog coating with color stability was prepared by mixing trixene 7960 (65.4% by wt.), PEG-800 (20.3% by wt.), diacetone alcohol (10% by wt.), sodium dioctyl sulfonic acid (3.2% by wt.), dibutyl tin dilaurate (0.57% by wt.), and an additional component (0.53% by wt. of the total mixture) comprising L-7602 (1.0% by wt.), L-7608 (1.0% by wt.) and diacetone alcohol (98.0% by wt.).

Example 26

An abrasion resistant, anti-fog coating with color stability was prepared by mixing trixene 7960 (65.4% by wt.), PEG-2000 (20.3% by wt.), diacetone alcohol (10% by wt.), sodium dioctyl sulfonic acid (3.2% by wt.), dibutyl tin dilaurate (0.57% by wt.), and an additional component (0.53% by wt. of the total mixture) comprising L-7602 (1.0% by wt.), L-7608 (1.0% by wt.) and diacetone alcohol (98.0% by wt.).

Example 27

An abrasion resistant, anti-fog coating with color stability was by mixing trixene 7960 (65.4% by wt.), P41/200 (20.3% by wt.), diacetone alcohol (10% by wt.), sodium dioctyl sulfonic acid (3.2% by wt.), dibutyl tin dilaurate (0.57% by wt.), and an additional component (0.53% by wt. of the total mixture) comprising L-7602 (1.0% by wt.), L-7608 (1.0% by wt.) and diacetone alcohol (98.0% by wt.).

Example 28

An abrasion resistant, anti-fog coating with color stability was prepared by mixing trixene 7960 (65.4% by wt.), P41/300 (20.3% by wt.), diacetone alcohol (10% by wt.), sodium dioctyl sulfonic acid (3.2% by wt.), dibutyl tin dilaurate (0.57% by wt.), and an additional component (0.53% by wt. of the total mixture) comprising L-7602 (1.0% by wt.), L-7608 (1.0% by wt.) and diacetone alcohol (98.0% by wt.).

Example 29

An abrasion resistant, anti-fog coating with color stability was prepared by mixing trixene 7960 (65.4% by wt.), P41/2000 (20.3% by wt.), diacetone alcohol (10% by wt.), sodium dioctyl sulfonic acid (3.2% by wt.), dibutyl tin dilaurate (0.57% by wt.), and an additional component (0.53% by wt. of the total mixture) comprising L-7602 (1.0% by wt.), L-7608 (1.0% by wt.) and diacetone alcohol (98.0% by wt.).

Example 30

An abrasion resistant, anti-fog coating with color stability was prepared by mixing trixene 7960 (65.4% by wt.), P41/3000 (20.3% by wt.), diacetone alcohol (10% by wt.), sodium dioctyl sulfonic acid (3.2% by wt.), dibutyl tin dilaurate (0.57% by wt.), and an additional component (0.53% by wt. of the total mixture) comprising L-7602 (1.0% by wt.), L-7608 (1.0% by wt.) and diacetone alcohol (98.0% by wt.).

Example 31

An abrasion resistant, anti-fog coating with color stability was prepared by mixing trixene 7960 (65.4% by wt.), P41/12000 (20.3% by wt.), diacetone alcohol (10% by wt.), sodium dioctyl sulfonic acid (3.2% by wt.), dibutyl tin dilaurate (0.57% by wt.), and an additional component (0.53% by wt. of the total mixture) comprising L-7602 (1.0% by wt.), L-7608 (1.0% by wt.) and diacetone alcohol (98.0% by wt.).

Example 32

An abrasion resistant, anti-fog coating with color stability was prepared by mixing trixene 7960 (65.4% by wt.), PEG-300 (20.3% by wt.), diacetone alcohol (10% by wt.), sodium dioctyl sulfonic acid (3.2% by wt.), dibutyl tin dilaurate (0.57% by wt.), and an additional component (0.53% by wt. of the total mixture) comprising L-7602 (1.0% by wt.), L-7608 (1.0% by wt.) and diacetone alcohol (98.0% by wt.).

Example 33

An abrasion resistant, anti-fog coating with color stability was prepared by mixing trixene 7960 (65.4% by wt.), PEG- 540 (20.3% by wt.), diacetone alcohol (10% by wt.), sodium dioctyl sulfonic acid (3.2% by wt.), dibutyl tin dilaurate (0.57% by wt.), and an additional component (0.53% by wt. of the total mixture) comprising L-7602 (1.0% by wt.), L-7608 (1.0% by wt.) and diacetone alcohol (98.0% by wt.).

Example 34

An abrasion resistant, anti-fog coating with color stability was prepared by mixing trixene 7960 (65.4% by wt.), PEG-3000 (20.3% by wt.), diacetone alcohol (10% by wt.), sodium dioctyl sulfonic acid (3.2% by wt.), dibutyl tin dilaurate (0.57% by wt.), and an additional component (0.53% by wt. of the total mixture) comprising L-7602 (1.0% by wt.), L-7608 (1.0% by wt.) and diacetone alcohol (98.0% by wt.).

Example 35

An abrasion resistant, anti-fog coating with color stability was prepared by mixing trixene 7960 (65.4% by wt.), PEG-4600 (20.3% by wt.), diacetone alcohol (10% by wt.), sodium dioctyl sulfonic acid (3.2% by wt.), dibutyl tin dilaurate (0.57% by wt.), and an additional component (0.53% by wt. of the total mixture) comprising L-7602 (1.0% by wt.), L-7608 (1.0% by wt.) and diacetone alcohol (98.0% by wt.).

Example 36

An abrasion resistant, anti-fog coating with color stability was prepared by mixing comprising trixene 7960 (65.4% by wt.), PEG-8000 (20.3% by wt.), diacetone alcohol (10% by wt.), sodium dioctyl sulfonic acid (3.2% by wt.), dibutyl tin dilaurate (0.57% by wt.), and an additional component (0.53% by wt. of the total mixture) comprising L-7602 (1.0% by wt.), L-7608 (1.0% by wt.) and diacetone alcohol (98.0% by wt.).

Example 37

An abrasion resistant, anti-fog coating with color stability was prepared by mixing trixene 7960 (64.4% by wt.), P41/300 (24.5% by wt.), diacetone alcohol (10% by wt.), dibutyl tin dilaurate (0.57% by wt.), and an additional component (0.53% by wt. of the total mixture) comprising L-7602 (1.0% by wt.), L-7608 (1.0% by wt.) and diacetone alcohol (98.0% by wt.).

Example 38

An abrasion resistant, anti-fog coating with color stability was prepared by mixing trixene 7960 (62.1% by wt.), P41/300 (23.6% by wt.), diacetone alcohol (10% by wt.), sodium dioctyl sulfonic acid (3.2% by wt.), dibutyl tin dilaurate (0.57% by wt.), and an additional component (0.53% by wt. of the total mixture) comprising L-7602 (1.0% by wt.), L-7608 (1.0% by wt.) and diacetone alcohol (98.0% by wt.).

Example 39

An abrasion resistant, anti-fog coating with color stability was prepared by mixing trixene 7960 (59.3% by wt.), P41/300 (29.6% by wt.), diacetone alcohol (10% by wt.), dibutyl tin dilaurate (0.57% by wt.), L-7602 (0.005% by wt.) and L-7608 (0.005% by wt.).

Example 40

An abrasion resistant, anti-fog coating with color stability was prepared by mixing trixene 7960 (57.2% by wt.), P41/300 (28.5% by wt.), diacetone alcohol (10% by wt.), sodium dioctyl sulfonic acid (3.2% by wt.), dibutyl tin dilaurate (0.57% by wt.), and an additional component (0.53% by wt. of the total mixture) comprising L-7602 (1.0% by wt.), L-7608 (1.0% by wt.) and diacetone alcohol (98.0% by wt.).

Example 41

An abrasion resistant, anti-fog coating with color stability was prepared by mixing trixene 7960 (56.9% by wt.), P41/300 (32% by wt.), diacetone alcohol (10% by wt.), dibutyl tin dilaurate (0.57% by wt.), and an additional component (0.53% by wt. of the total mixture) comprising L-7602 (1.0% by wt.), L-7608 (1.0% by wt.) and diacetone alcohol (98.0% by wt.).

Example 42

An abrasion resistant, anti-fog coating with color stability was prepared by mixing trixene 7960 (54.4% by wt.), P41/300 (34.5% by wt.), diacetone alcohol (10% by wt.), dibutyl tin dilaurate (0.57% by wt.), and an additional component (0.53% by wt. of the total mixture) comprising L-7602 (1.0% by wt.), L-7608 (1.0% by wt.) and diacetone alcohol (98.0% by wt.).

Example 43

An abrasion resistant, anti-fog coating with color stability was prepared by mixing trixene 7960 (51.9% by wt.), P41/300 (37% by wt.), diacetone alcohol (10% by wt.), dibutyl tin dilaurate (0.57% by wt.), and an additional component (0.53% by wt. of the total mixture) comprising L-7602 (1.0% by wt.), L-7608 (1.0% by wt.) and diacetone alcohol (98.0% by wt.).

Example 44

Figure 11:
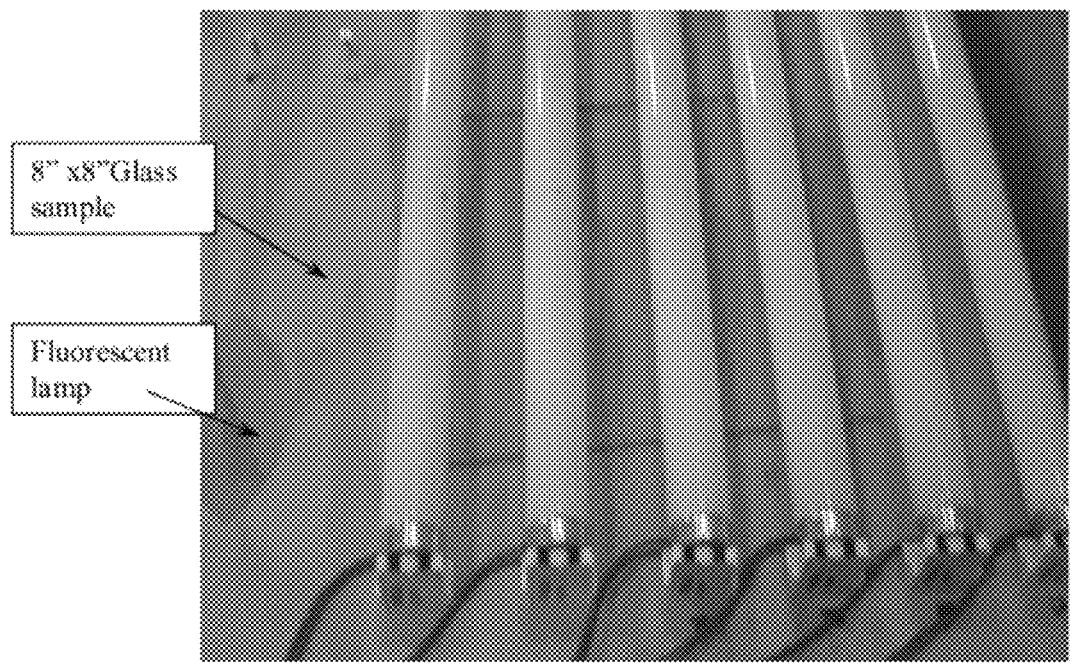
FIG. 11 shows a fluorescent lamp fixture used to radiate no-fog coated glass samples during color stability testing.
Figure 12:
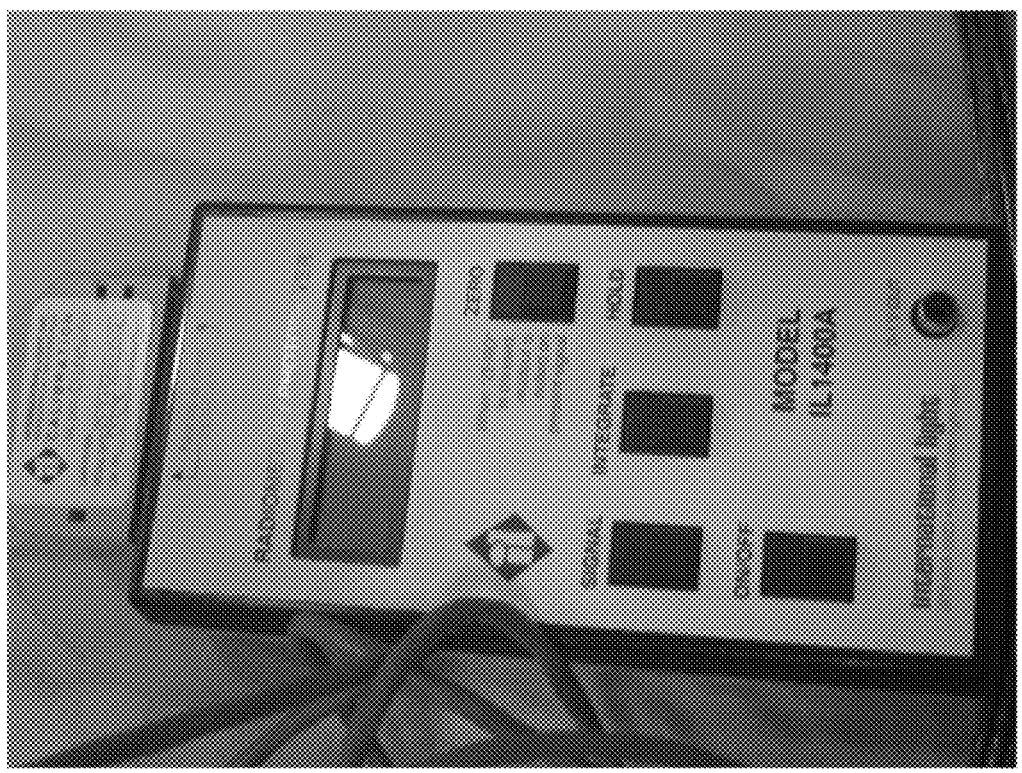
FIG. 12 shows a Model IL 1400A Radiometer/Photometer used during color stability testing.
Figure 13:
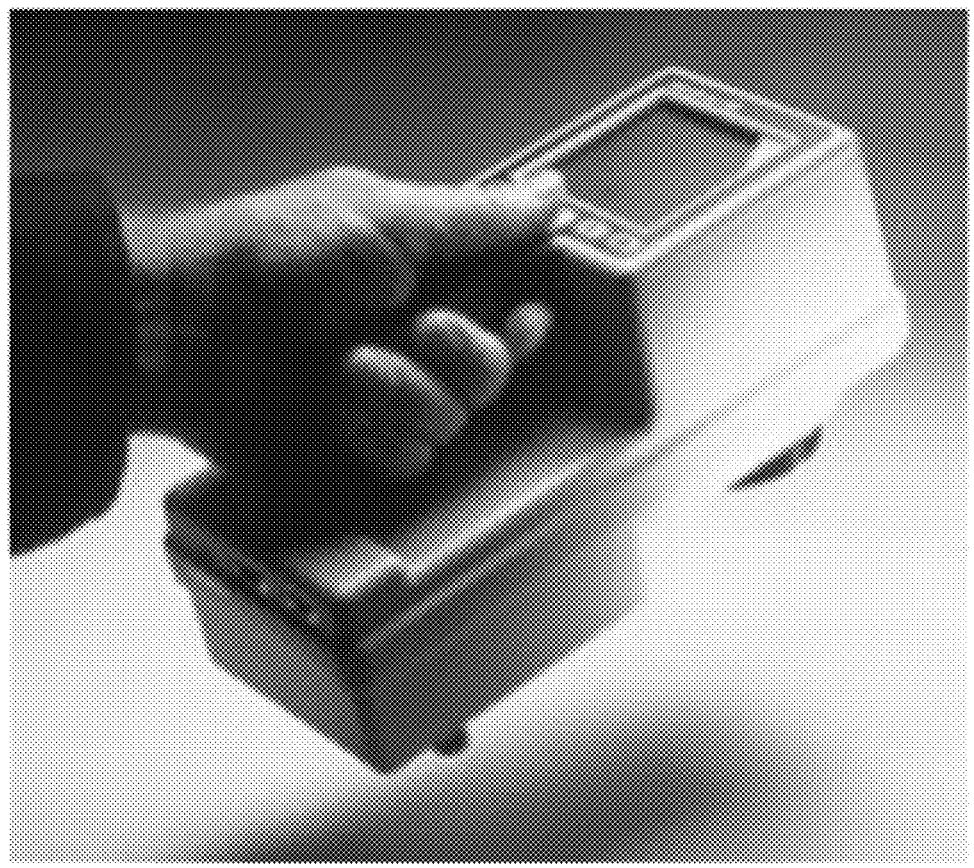
FIG. 13 shows a Mini Scan Xe Plus Color Spectra Photometer used in the color stability tests.

Color stability testing was performed on the anti-fog coatings set forth in Examples 15 and 41. In one test, Example 15 no-fog coated 8"×8" glass samples were placed directly under fluorescent lamps (FIG. 11) having a radiant intensity of about 0.05 mw/cm$^2$. CIELAB L*, a* and b* values were measured at ambient conditions (75° F. dry bulb temperature and 55% relative humidity) during a 20 day period using a radiometer/photometer (FIG. 12) and a color spectra photometer (FIG. 13). In an additional test, Example 15 no-fog coated 8"×8" glass samples were placed under fluorescent lamps (FIG. 11) with a radiant intensity of about 0.05 mw/cm$^2$, a polycarbonate 3 mm sheet was placed in between the lamps and coated glass, and L*, a* and b* values were measured at ambient conditions (75° F. dry bulb temperature and 55% relative humidity) during a 20 day period using a radiometer/photometer (FIG. 12) and a color spectra photometer (FIG. 13). In an further test, Example 41 no-fog coated 8"×8" glass samples were directly placed under the fluorescent lamps (FIG. 11) with a radiant intensity of about 0.05 mw/cm$^2$. L*, a* and b* values were measured at ambient conditions (75° F. dry bulb temperature and 55% relative humidity) during a 30 day period using a radiometer/photometer (FIG. 12) and a color spectra photometer (FIG. 13).

Figure 14:
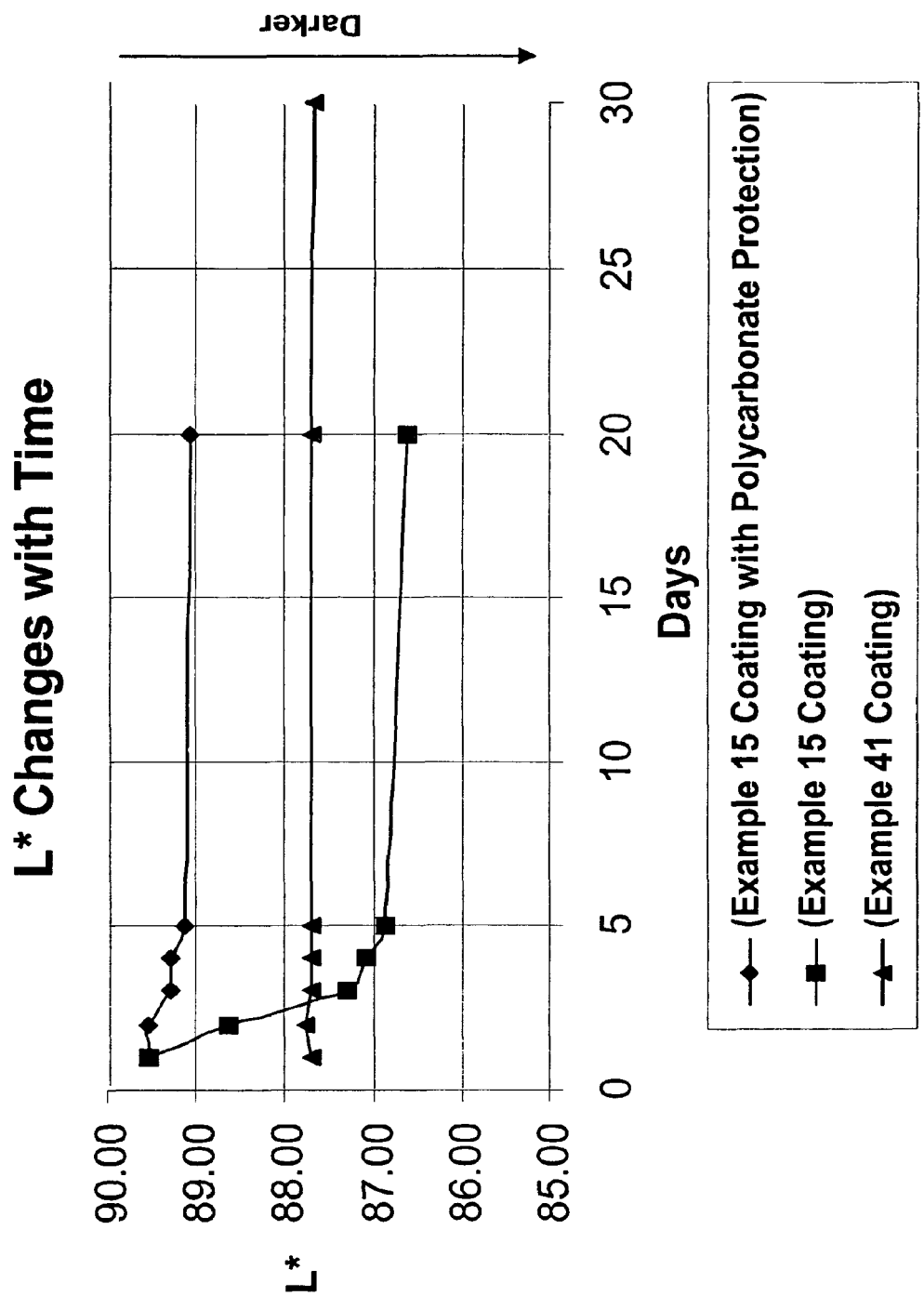
FIG. 14 is a chart comparing the color stability, as shown by the change in L*, of three coating samples that have been exposed to fluorescent light, wherein one sample comprises the coating in Example 41, a second sample comprises the coating in Example 15, and a third sample comprises the coating in Example 15 with a polycarbonate filter in-between the light source and sample.
Figure 15:
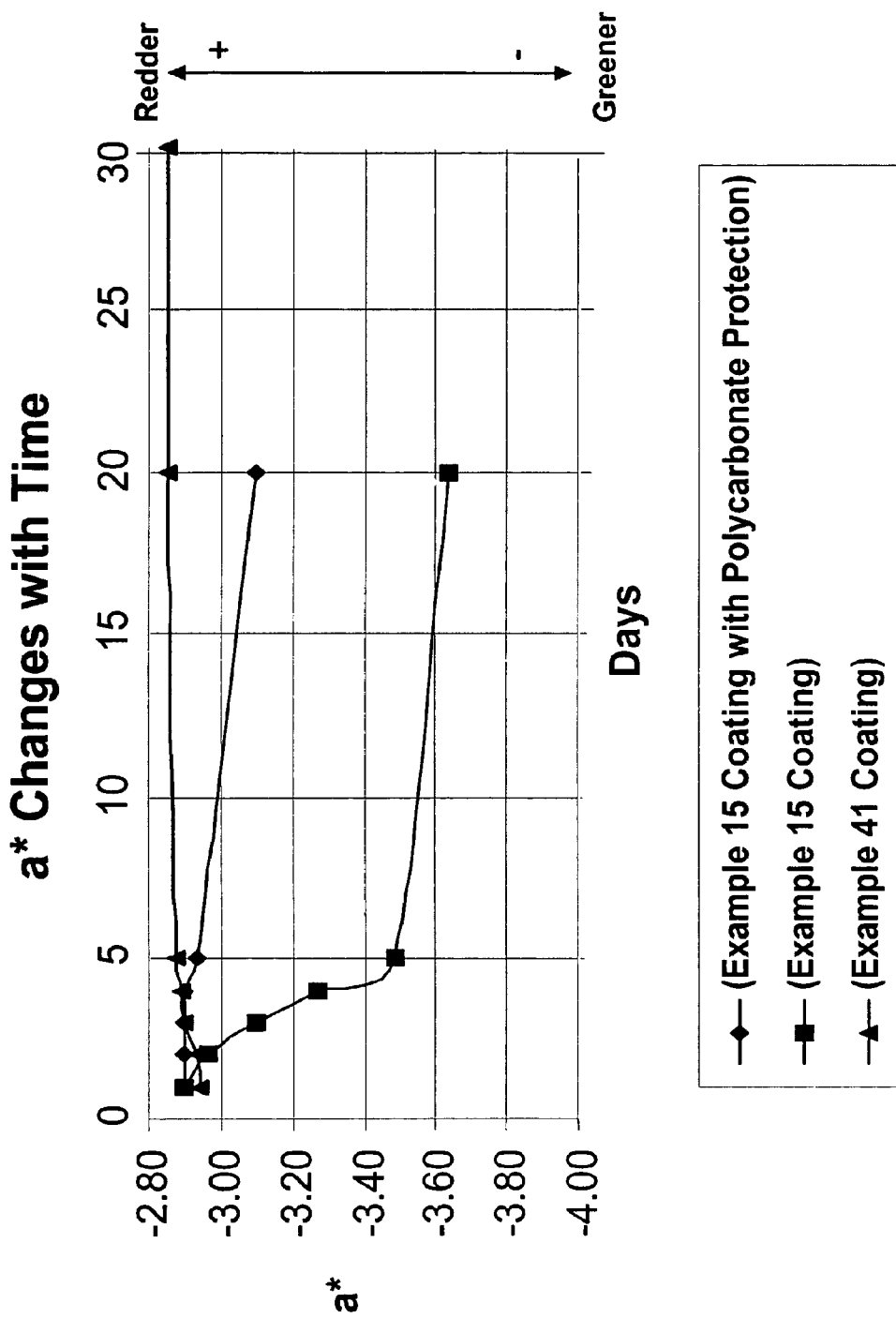
FIG. 15 is a chart comparing the color stability, as shown by the change in a*, of three coating samples that have been exposed to fluorescent light, wherein one sample comprises the coating in Example 41, a second sample comprises the coating in Example 15, and a third sample comprises the coating in Example 15 with a polycarbonate filter in-between the light source and sample.
Figure 16:
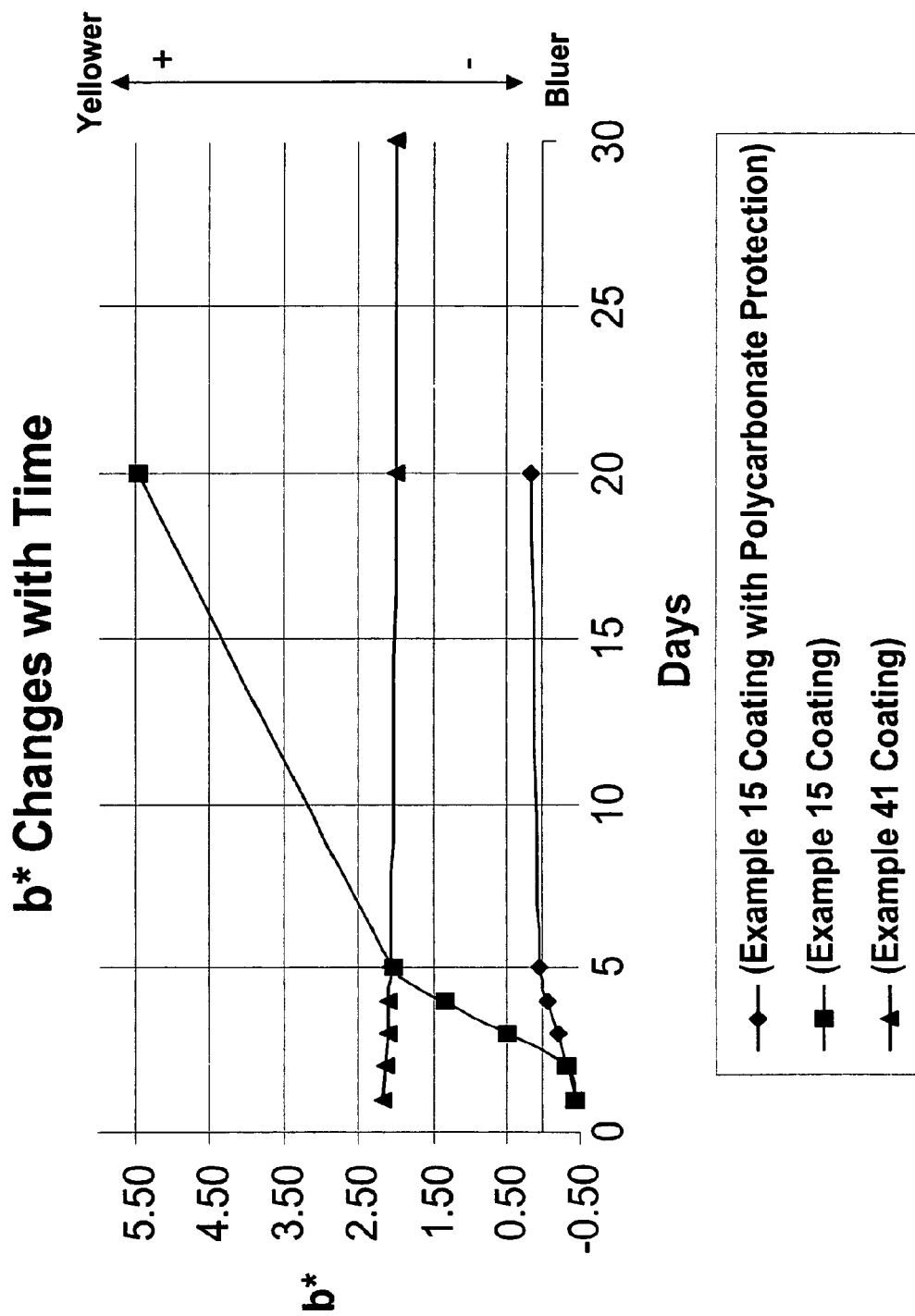
FIG. 16 is a chart comparing the color stability, as shown by the change in b*, of three coating samples that have been exposed to fluorescent light, wherein one sample comprises the coating in Example 41, a second sample comprises the coating in Example 15, and a third sample comprises the coating in Example 15 with a polycarbonate filter in-between the light source and sample.

The results of the tests are summarized in FIGS. 14-16. The Example 15 no-fog coated glass lites turned dark yellow under the direct light source. The Example 15 no-fog coated samples with polycarbonate protection turned yellow within the acceptable range. The Example 41 no-fog coated glass lites were not turned into yellow under the direct light source, but a slight color change appeared in the blue axis direction.

One way to determine infringement of the claims forth below is to follow the procedure set forth in this Example. The appropriate claimed time periods should obviously be applied.

Example 45

Color stability testing was performed on the anti-fog coating set forth in Example 41. The coating was applied to 8"×8" glass substrate and exposed to fluorescent light for a period of 24 days at about 0.05 mw/cm² radiant intensity. Test conditions and methods of analysis were the same as those in Example 44. Results are provided below.

| Color Stability Tests for Coating in Example 41 | | | | | |
|---|---|---|---|---|---|
| Day | $L*^1$ | $a*^2$ | $b*^3$ | $\Delta L^4$ | $\Delta a^5$ | $\Delta b^6$ |
| 1 | 87.70 | −2.94 | 2.17 | | | |
| 2 | 87.76 | −2.93 | 2.16 | 0.06 | 0.01 | −0.01 |
| 4 | 87.72 | −2.90 | 2.12 | 0.02 | 0.04 | −0.05 |
| 5 | 87.70 | −2.89 | 2.10 | 0 | 0.05 | −0.07 |
| 8 | 87.69 | −2.88 | 2.07 | −0.01 | 0.06 | −0.10 |
| 10 | 87.69 | −2.85 | 2.01 | −0.01 | 0.09 | −0.16 |
| 24 | 87.68 | −2.85 | 2.00 | −0.02 | 0.09 | −0.17 |

[1] CIE 1976 Psychometric Lightness
[2] Red(+)-Green(−) axis
[3] Yellow(+)-Blue(−) axis
[4] $\Delta L$ = L*sample-L* standard (day 1). If $\Delta L$ is positive, the sample is lighter than the standard. If $\Delta L$ is negative, the sample is darker than the standard.
[5] $\Delta a$ = a* sample-a* standard (day 1). If $\Delta a$ is positive, then the sample is redder than the standard. If $\Delta a$ is negative, then the sample is greener than the standard.
[6] $\Delta b$ = b* sample-b* standard (day 1). If $\Delta b$ is positive, then the sample is more yellow than the standard. If $\Delta b$ is negative, the sample is bluer than the standard.

Example 46

Color stability testing was performed on the anti-fog coating set forth in Example 14. The coating was applied to 8"×8" glass substrate and exposed to fluorescent light for a period of 24 days at about 0.05 mw/cm² radiant intensity. Test conditions and methods of analysis were the same as those in Example 44. Results are provided below.

| Color Stability Tests for Coating in Example 14 | | | | | |
|---|---|---|---|---|---|
| Day | $L*^1$ | $a*^2$ | $b*^3$ | $\Delta L^4$ | $\Delta a^5$ | $\Delta b^6$ |
| 1 | 89.53 | −2.90 | −0.42 | | | |
| 4 | 89.53 | −2.90 | −0.30 | 0 | 0 | 0.12 |
| 11 | 89.30 | −2.90 | −0.20 | −0.23 | 0 | 0.22 |
| 21 | 89.23 | −3.00 | −0.07 | −0.30 | −0.10 | 0.35 |
| 28 | 89.13 | −2.93 | 0.07 | −0.40 | −0.03 | 0.49 |
| 37 | 89.07 | −3.10 | 0.15 | −0.46 | −0.20 | 0.57 |

[1] CIE 1976 Psychometric Lightness
[2] Red(+)-Green(−) axis
[3] Yellow(+)-Blue(−) axis
[4] $\Delta L$ = L*sample-L* standard (day 1). If $\Delta L$ is positive, the sample is lighter than the standard. If $\Delta L$ is negative, the sample is darker than the standard.
[5] $\Delta a$ = a* sample-a* standard (day 1). If $\Delta a$ is positive, then the sample is redder than the standard. If $\Delta a$ is negative, then the sample is greener than the standard.
[6] $\Delta b$ = b* sample-b* standard (day 1). If $\Delta b$ is positive, then the sample is more yellow than the standard. If $\Delta b$ is negative, the sample is bluer than the standard.

Example 47

Anti-fog testing was performed on refrigerator doors having, among others, the coating set forth in Examples 39 and 41. Testing was conducted under the following conditions: dry bulb temperature 75° F.; relative humidity 55%, discharge air temperature −12° F.; and door surface temperature on the product side −3° F.

When the samples were tested, the coated surface was dry and had substantially no dust accumulation. The refrigerator door was opened and anti-fogging properties were tested at certain time intervals. More particularly, the following time intervals were tested: 6 seconds, 15 seconds, 30 seconds, 1 minute, 2 minutes, 2 minutes and 30 seconds, 3 minutes, 4 minutes and 5-15 minutes. When coated doors having the surface temperatures set forth above were opened, and then exposed to the ambient conditions discussed above, substantially no fogging occurred during the first ten minutes of exposure. After 10 minutes, the glass coated with Example 39 began to develop fog at the edges of the glass sample. Similarly, after 15 minutes, the glass coated with Example 41 began to develop fog at the edges of the glass sample. Coating samples cleaned with isopropyl alcohol prior to testing decreased the fogging time by about 2 minutes.

Example 48

Anti-fog testing was performed on refrigerator doors having, among others, the coating set forth in Example 41. The testing conditions were similar to those in Example 47.

When the samples were tested, the coated surface was dry. The refrigerator door was opened and anti-fogging properties were tested at certain time intervals. More particularly, the following time intervals were tested: 2 minutes, 3 minutes, 5 minute, 10 minutes, and 15 minutes. Additionally, the anti-fogging properties were tested at different depths in the coating referred to as layers. More particularly, the following layers were tested: layer 1 was about 2 mills thick and lay next to the glass substrate; layer 2 was about 2 to 3 mills into the coating; and layer 3 was about 3 to 5 mills into the coating. Layer 1 began to fog at the edges of the door after about 2 minutes. Similarly, layer 2 began to fog up after 10 minutes. Layer 3 remained fog free during the 15 minute test.

We claim:

1. A method of manufacturing a refrigerator door having a substantially transparent substrate, the method comprising the acts of:
mixing an isocyanate with a polyol to form a mixture, the isocyanate comprising a compound selected from the group consisting of ϵ-caprolactam blocked toluene diisocyanate, 3,5-dimethylpyrazole blocked toluene diisocyanate, 3,5-dimethylpyrazole blocked isophorone diisocyanate, 3,5-dimethylpyrazole blocked isophorone diisocyanate trimer, 3,5-dimethylpyrazole blocked hexamethylene diisocyanate biuret, diethyl malonate blocked hexamethylene diisocyanate biuret, ϵ-caprolactam blocked hexamethylene diisocyanate trimer, 3,5-dimethylpyrazole blocked hexamethylene diisocyanate trimer, methylethylketoxime blocked hexamethylene diisocyanate trimer, 3,5-dimethylpyrazole and diethyl malonate blocked isophorone diisocyanate trimer, 3,5-dimethylpyrazole and diethyl malonate blocked hexamethylene diisocyanate biuret, 3,5-dimethylpyrazole and diethyl malonate blocked hexamethylene diisocyanate trimer and a combination thereof, wherein the mixture comprises less than about 55% by weight of polyol, and wherein the mixture is substantially free of surfactant;
applying the mixture to at least a portion of the substantially transparent substrate; and
curing the mixture to form a coating, the coating showing a change in L* of less than about 10.0, a change in a* of less than about 1.2, and a change in b* of less than about 6.0, when the coating is exposed to fluorescent light having a radiant intensity of 0.05 mw/cm$^2$ over a period of greater than 5 days, wherein, using CIELAB values, L* measures the psychometric lightness of a coating, an L* value of 100 indicating clear and a value of 0 indicating black, a* measures the color of the coating as referenced against a red(+) and green(−) axis, and b* measures the color of the coating as referenced against a yellow(+) and blue(−) axis, wherein the coating comprises a hydrophobic surface, wherein the substrate is part of a refrigerator door or is used to manufacture a refrigerator door.

2. The method of claim 1, wherein the isocyanate comprises 3,5-dimethylpyrazole blocked hexamethylene diisocyanate biuret.

3. The method of claim 1, wherein the polyol comprises a compound selected from the group consisting of tetrahydroxy functional copolymers of ethylene oxide and propylene oxide.

4. The method of claim 1, wherein the mixture comprises about 51 to 66% by weight hexamethylene diisocyanate and about 20 to 37% by weight of polyol.

5. The method of claim 1, wherein the isocyanate comprises 3,5-dimethylpyrazole blocked hexamethylene diisocyanate and the polyol comprises tetrahydroxy functional copolymers of ethylene oxide and propylene oxide.

6. The method of claim 1, wherein the change in L* is less than about 0.05, the change in a* is less than about 0.15, and the change in b* is less than about 0.25.

7. The method of claim 6, wherein the period is greater than 30 days.

8. The method of claim 1, wherein the period is greater than 30 days.

9. The method of claim 1, wherein the hydrophobic surface has a surface tension of about 50-57 dynes/cm or less.

10. A method of manufacturing a refrigerator door having a substantially transparent substrate, the method comprising:

mixing an isocyanate with a polyol to form a mixture, the isocyanate comprising a compound selected from the group consisting of ϵ-caprolactam blocked toluene diisocyanate, 3,5-dimethylpyrazole blocked toluene diisocyanate, 3,5-dimethylpyrazole blocked isophorone diisocyanate, 3,5-dimethylpyrazole blocked isophorone diisocyanate trimer, 3,5-dimethylpyrazole blocked hexamethylene diisocyanate biuret, diethyl malonate blocked hexamethylene diisocyanate biuret, ϵ-caprolactam blocked hexamethylene diisocyanate trimer, 3,5-dimethylpyrazole blocked hexamethylene diisocyanate trimer, methylethylketoxime blocked hexamethylene diisocyanate trimer, 3,5-dimethylpyrazole and diethyl malonate blocked isophorone diisocyanate trimer, 3,5-dimethylpyrazole and diethyl malonate blocked hexamethylene diisocyanate biuret, 3,5-dimethylpyrazole and diethyl malonate blocked hexamethylene diisocyanate trimer and a combination thereof, wherein the mixture comprises less than about 55% by weight of polyol, and wherein the mixture is substantially free of surfactant;

applying the mixture to at least a portion of the substantially transparent substrate; and curing the mixture to form a coating, the coating being part hydrophilic and part hydrophobic and showing a change in L* of less than about 10.0, a change in a* of less than about 1.2, and a change in b* of less than about 6.0, when the coating is exposed to fluorescent light having a radiant intensity of 0.05 mw/cm.sup.2 over a period of greater than 10 days, wherein, using CIELAB values, L* measures the psychometric lightness of a coating, an L* value of 100 indicating clear and a value of 0 indicating black, a* measures the color of the coating as referenced against a red(+) and green(−) axis, and b* measures the color of the coating as referenced against a yellow(+) and blue(−) axis, wherein the coating comprises a hydrophobic surface, wherein the substrate is part of a refrigerator door or is used to manufacture a refrigerator door.

11. The method of claim 10, wherein the hydrophobic surface has a surface tension of about 50-57 dynes/cm or less.

* * * * *